United States Patent
Huang

(10) Patent No.: US 9,456,114 B2
(45) Date of Patent: Sep. 27, 2016

(54) VIDEO SURVEILLANCE COMPONENT AND VIDEO SURVEILLANCE ASSEMBLY

(71) Applicant: VIVOTEK INC., New Taipei (TW)

(72) Inventor: Chung-Yon Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 368 days.

(21) Appl. No.: 13/967,909

(22) Filed: Aug. 15, 2013

(65) Prior Publication Data

US 2014/0049638 A1    Feb. 20, 2014

(30) Foreign Application Priority Data

Aug. 17, 2012    (TW) .............................. 101215912 U
Dec. 19, 2012    (TW) .............................. 101224594 U

(51) Int. Cl.
  *H04N 5/225*    (2006.01)

(52) U.S. Cl.
  CPC .................................. *H04N 5/2252* (2013.01)

(58) Field of Classification Search
  CPC ..................................................... H04N 5/2252
  See application file for complete search history.

(56) References Cited

U.S. PATENT DOCUMENTS

| | | | | |
|---|---|---|---|---|
| 5,946,404 A | * | 8/1999 | Bakshi | G08B 13/19619 16/383 |
| 2005/0025360 A1 | * | 2/2005 | Gin | G06K 9/00221 382/181 |

\* cited by examiner

*Primary Examiner* — James Pontius
(74) *Attorney, Agent, or Firm* — Maschoff Brennan

(57) ABSTRACT

A video surveillance component includes a base and a camera. The camera includes a case and a camera lens module. The case is detachably assembled to the base. The camera lens module is installed on the case. Moreover, a video surveillance assembly includes two video surveillance components. Each of the two video surveillance components includes a camera and a base having a back plate. The camera includes a case and a camera lens module installed on the case. The two back plates of the two bases are attached to each other, so as to expand the field of view of the video surveillance assembly.

35 Claims, 25 Drawing Sheets

VIDEO SURVEILLANCE COMPONENT AND VIDEO SURVEILLANCE ASSEMBLY

CROSS-REFERENCE TO RELATED APPLICATIONS

This non-provisional application claims priority under 35 U.S.C. §119(a) on Patent Application No(s). 101215912 filed in Taiwan, R.O.C. on Aug. 17, 2012 and Patent Application No(s). 101224594 filed in Taiwan, R.O.C. on Dec. 19, 2012, the entire contents of which are hereby incorporated by reference.

BACKGROUND

1. Technical Field

The disclosure relates to a surveillance equipment, more particularly to a video surveillance component and a video surveillance assembly which are easy to assemble and disassemble.

2. Related Art

Generally speaking, the surveillance cameras are widely applied in several areas. For example, the surveillance cameras can be installed in a factory, a store, a building, a gateway or a passage of a house, a place needed to be supervised, or a place that is off the beaten track. Thereby, the incident can be recorded as evidence or for the purpose of the investigation if needed. Hence, the surveillance cameras can threaten the criminals to prevent them from committing crimes so that public order can be improved.

In today's technology, after a surveillance camera is installed on a specific place, for example, after a surveillance camera is fixed to the wall or to the table, it cannot easily be disassembled or be moved to another installation place. Furthermore, due to the arrangement of wires, a surveillance camera applicable to the wall is not necessarily applicable to the table.

Moreover, with regard to the traditional fisheye or wide-angle surveillance camera, a single camera cannot always provide a 360-degree view. When two fisheye surveillance cameras are assembled back to back to provide a complete 360-degree view, these cameras are difficult to be fixed to each other or be separated from each other.

SUMMARY

A video surveillance component comprises a base and a camera. The camera comprises a case and a camera lens module. The case is detachably assembled to the base. The camera lens module is installed on the case.

Moreover, a video surveillance assembly comprises two video surveillance components. Each of the two video surveillance components comprises a camera and a base having a back plate. The camera comprises a case and a camera lens module installed on the case. The two back plates of the two bases are attached to each other, so as to expand the field of view of the video surveillance assembly.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
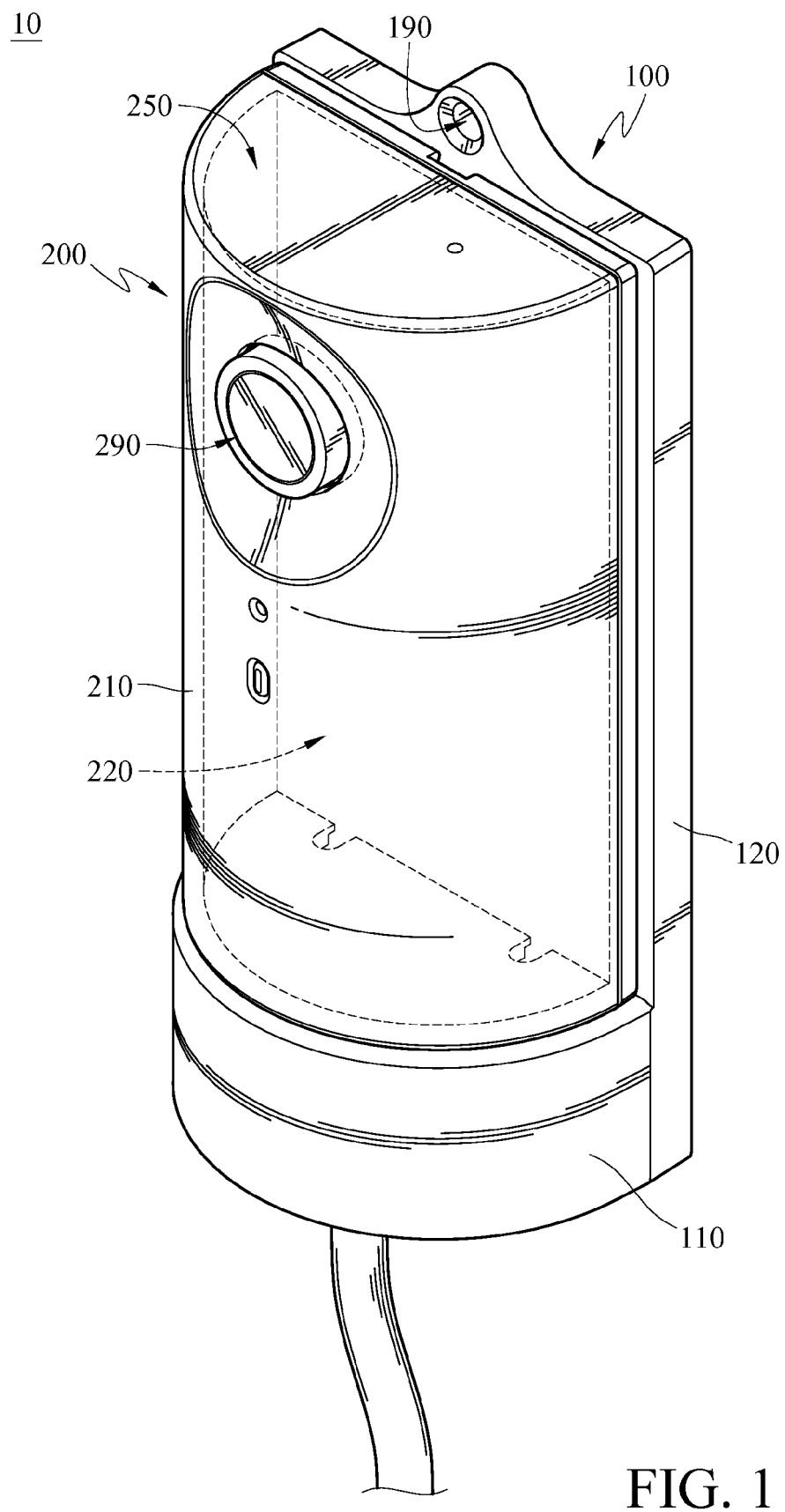
FIG. 1 is a perspective view of a video surveillance component according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
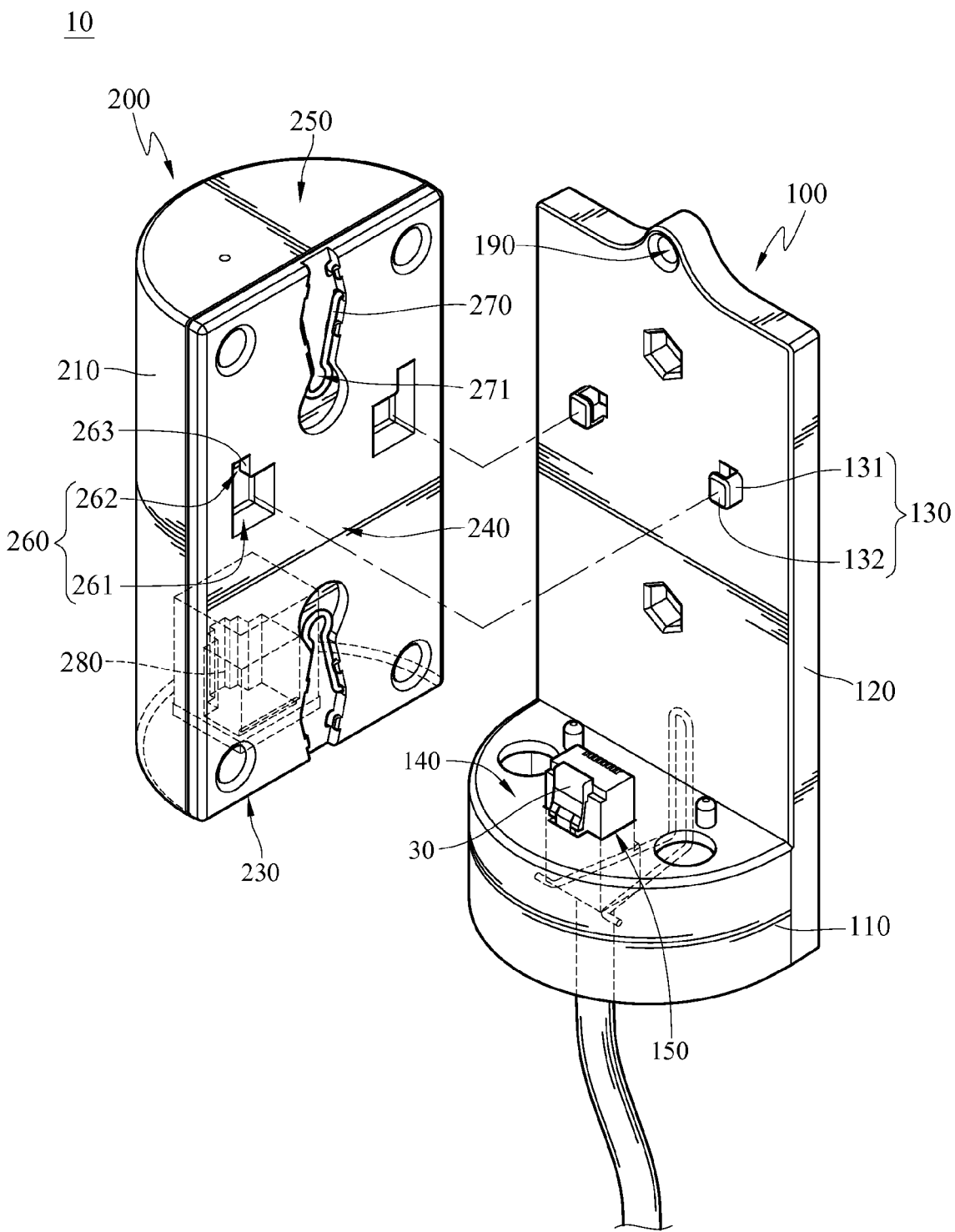
FIG. 2 is an exploded view of FIG. 1.
Figure 3:
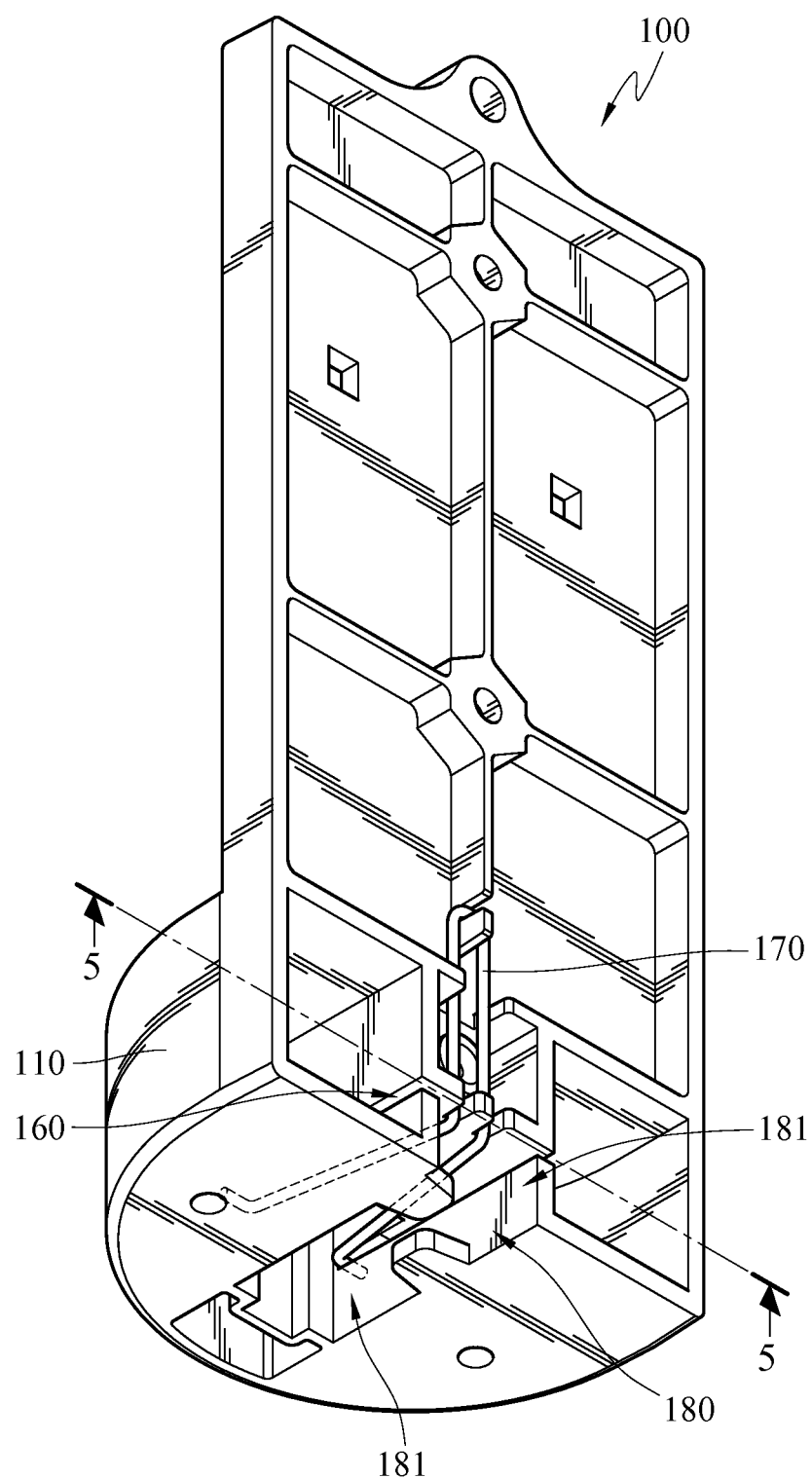
FIG. 3 is a perspective view of the base in FIG. 1 from another view angle.

Referring to FIG. 1 to FIG. 3, FIG. 1 is a perspective view of a video surveillance component according to an embodiment of the disclosure; FIG. 2 is an exploded view of FIG. 1; FIG. 3 is a perspective view of the base in FIG. 1 from another view angle.

The video surveillance component 10 of this embodiment comprises a base 100 and a camera 200. The base 100 comprises a support stand 110 and a back plate 120. The shape of the support stand 110 is a semicylinder as an example. The back plate 120 is erected on the support stand 110. The back plate 120 has two first fastening elements 130. In this embodiment, each of the first fastening elements 130 comprises a support block 131 and a fastening block 132 connected to each other. The fastening block 132 protrudes from the side edge of the support block 131.

The camera 200 comprises a case 210 and a camera lens module 290. The shape of the case 210 is a semicylinder as an example. The case 210 has an accommodating space 220. The case 210 is assembled to the base 100 in a detachable manner. The camera lens module 290 is installed on the case 210, in which a part of the camera lens module 290 is inside the accommodating space 220 of the case 210 or the entire camera lens module 290 is inside the accommodating space 220 of the case 210.

Specifically, the case 210 has a bottom surface 230, an installation surface 240 and a top surface 250 connected to each other. The bottom surface 230 and the top surface 250 are connected to the opposite sides of the installation surface 240 respectively. The case 210 comprises two second fastening elements 260 located on the installation surface 240. In this embodiment, each of the second fastening elements 260 comprises a release hole 261 and a fastening hole 262 connected to each other.

Moreover, in this embodiment, the number of the first fastening elements 130 and the number of the second fastening elements 260, for example, are two and two respectively, but the disclosure is not limited thereto. In other embodiment, the number of the first fastening elements 130 or the number of the second fastening elements 260 may be one or more than one.

Additionally, in this embodiment, the first fastening element 130 is the fastening block as an example, while the second fastening element 260 is the fastening hole as an example. In other embodiments, however, the structures of the first fastening element 130 and the second fastening element 260 are interchangeable, so it is not intended to limit the disclosure.

Figure 4A:
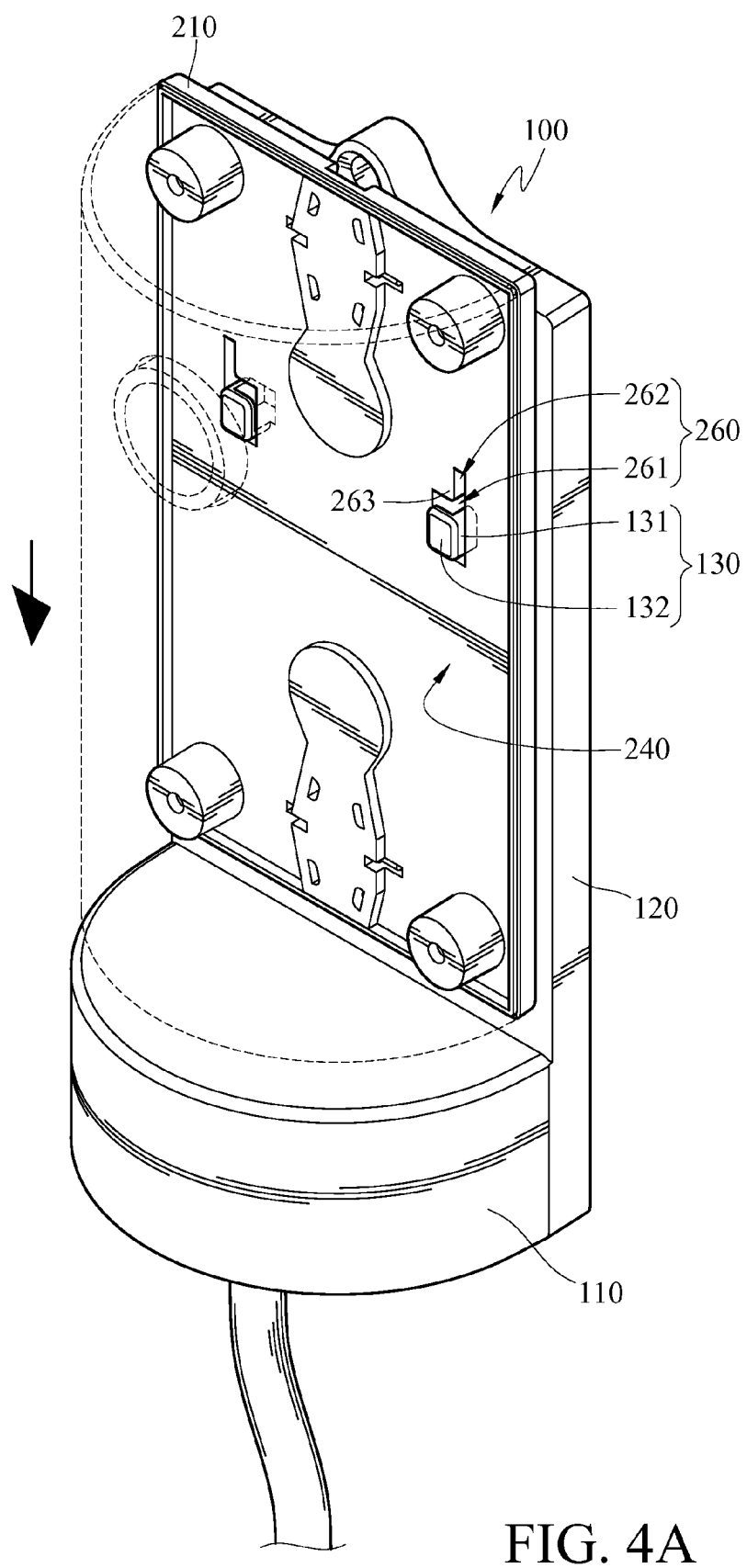
FIG. 4A and FIG. 4B are schematic views of the assembly of the base and the case in FIG. 1.
Figure 4B:
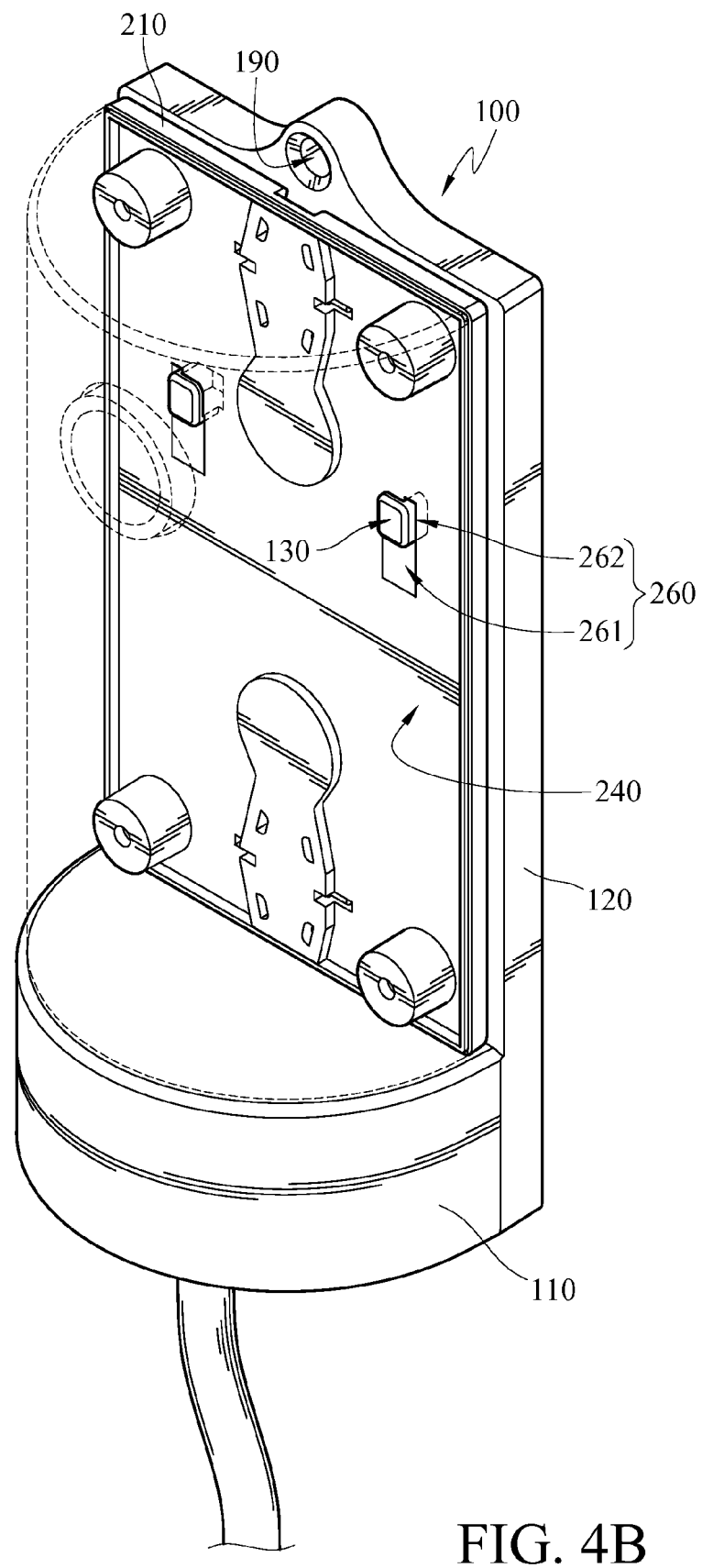

Referring to FIG. 4A and FIG. 4B, FIG. 4A and FIG. 4B are schematic views of the assembly of the base and the case in FIG. 1. The case 210 is configured for sliding relative to the base 100 and therefore has a release position and a fastening position. When the case 210 is at the release position (as shown in FIG. 4A), the two support blocks 131 are located at the two release holes 261 respectively. When the case 210 slides from the release position to the fastening position (as shown in FIG. 4B), the two support blocks 131 are located at the two fastening holes 262, and the two fastening blocks 132 are fastened with the side edges 263 of the two fastening holes 262 respectively, so as to make the two first fastening elements 130 are fastened with the two second fastening elements 260 respectively, and this makes the installation surface 240 lean against the back plate 120, and makes the bottom surface 230 lean against the support stand 110. Hence, the camera 200 can be assembled to the base 100 rapidly or can be disassembled from the base 100 rapidly.

As seen in FIG. 2 and FIG. 3, the camera 200 further comprises a socket 280. The socket 280 is installed on the case 210 and is located on the bottom surface 230. The support stand 110 has a support surface 140 and a through hole 150. The through hole 150 penetrates the support surface 140 of the support stand 110. The through hole 150 is configured for accommodating a cable 30, and a part of the cable 30 protrudes from the support surface 140. As a result, when the camera 200 is installed on the support stand 110, the cable 30 is capable of being electronically connected to the socket 280.

Nevertheless, in this embodiment, there is no fastening relationship between the socket 280 and the cable 30. The specific practices of it are as follows: the fastening structure of the cable 30 is laid inside the through hole 150, namely the fastening structure of the cable 30 does not protrude from the support surface 140. Thereby, the socket 280 does not fasten with the fastening structure of the cable 30, so that the camera 200 can be disassembled from the base 100 without hindrance.

Figure 5A:
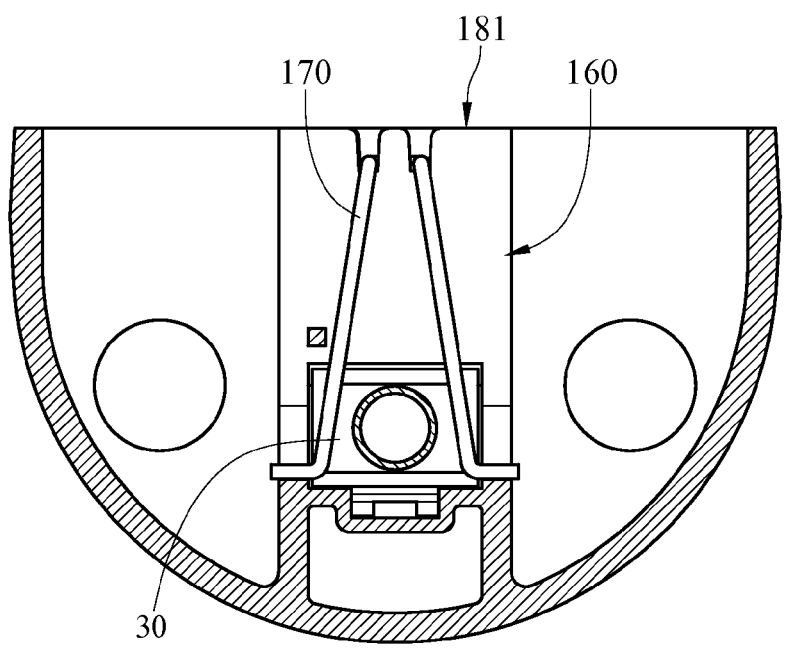
FIG. 5A and FIG. 5B are schematic views of the movement of the cable fastening member of the base in FIG. 1.
Figure 5B:
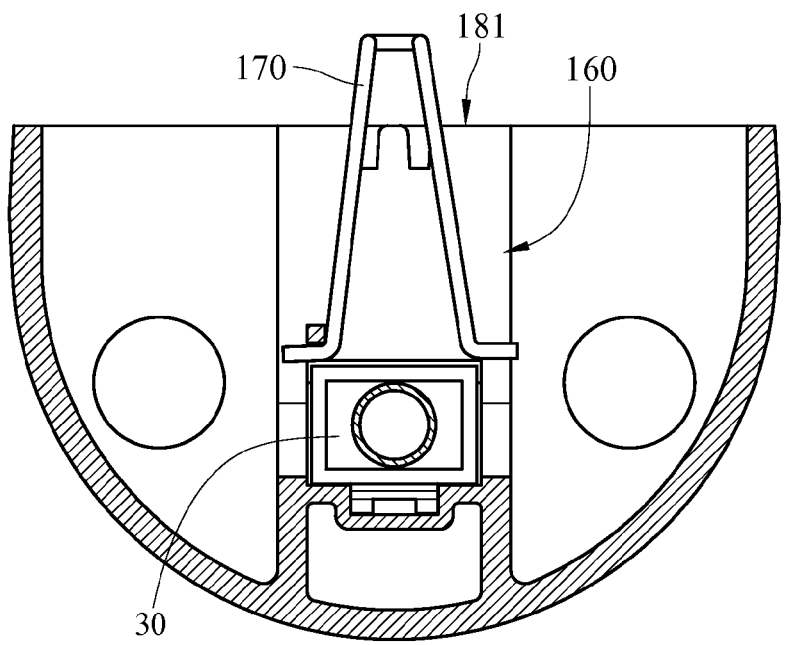

Referring to FIG. 5A and FIG. 5B, FIG. 5A and FIG. 5B are schematic views of the movement of the cable fastening member of the base in FIG. 1. For fixing the cable 30 to the base 100, the support stand 110 of this embodiment further comprises a sliding groove 160. The sliding groove 160 communicates the through hole 150. The video surveillance component 10 further comprises a fastening member 170. The fastening member 170 is slidably assembled to the sliding groove 160. In this embodiment, the fastening member 170 is a bent wire.

The fastening member 170 is configured for sliding relative to the sliding groove 160 and therefore has a fixed position and an exit position. When the fastening member 170 is at the fixed position (as shown in FIG. 5A), a part of the fastening member 170 is inside the through hole 150 and leans against the cable 30. Thereby, the relative position between the cable 30 and the support stand 110 is fixed. When the fastening member 170 is at the exit position (as shown in FIG. 5B), the fastening member 170 leaves the through hole 150 so that the fastening member 170 is no longer leaning against the cable 30. Thereby, the cable 30 is configured for exiting from the through hole 150.

Figure 6A:
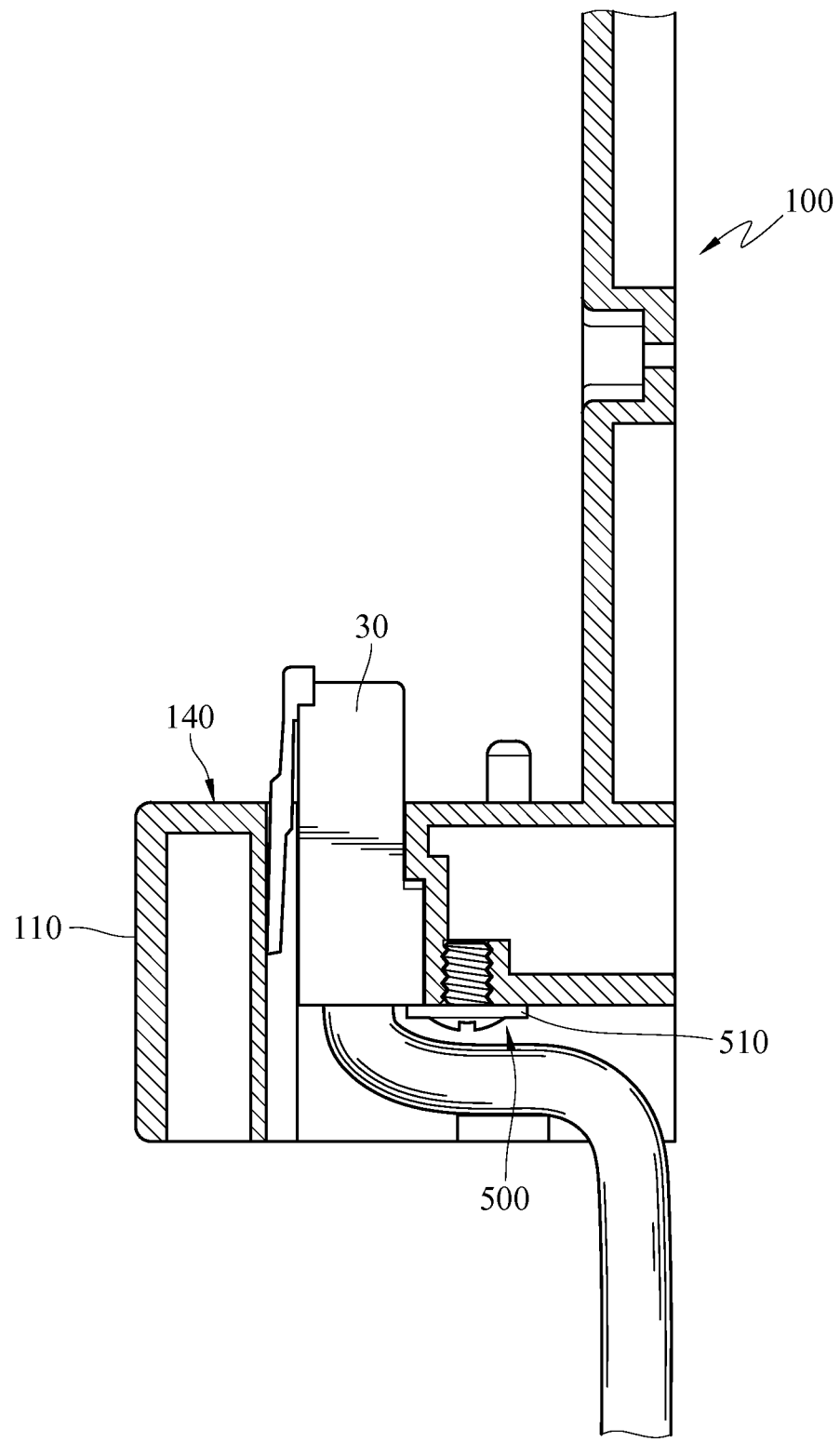
FIG. 6A is a sectional view of a support stand according to another embodiment of the disclosure.
Figure 6B:
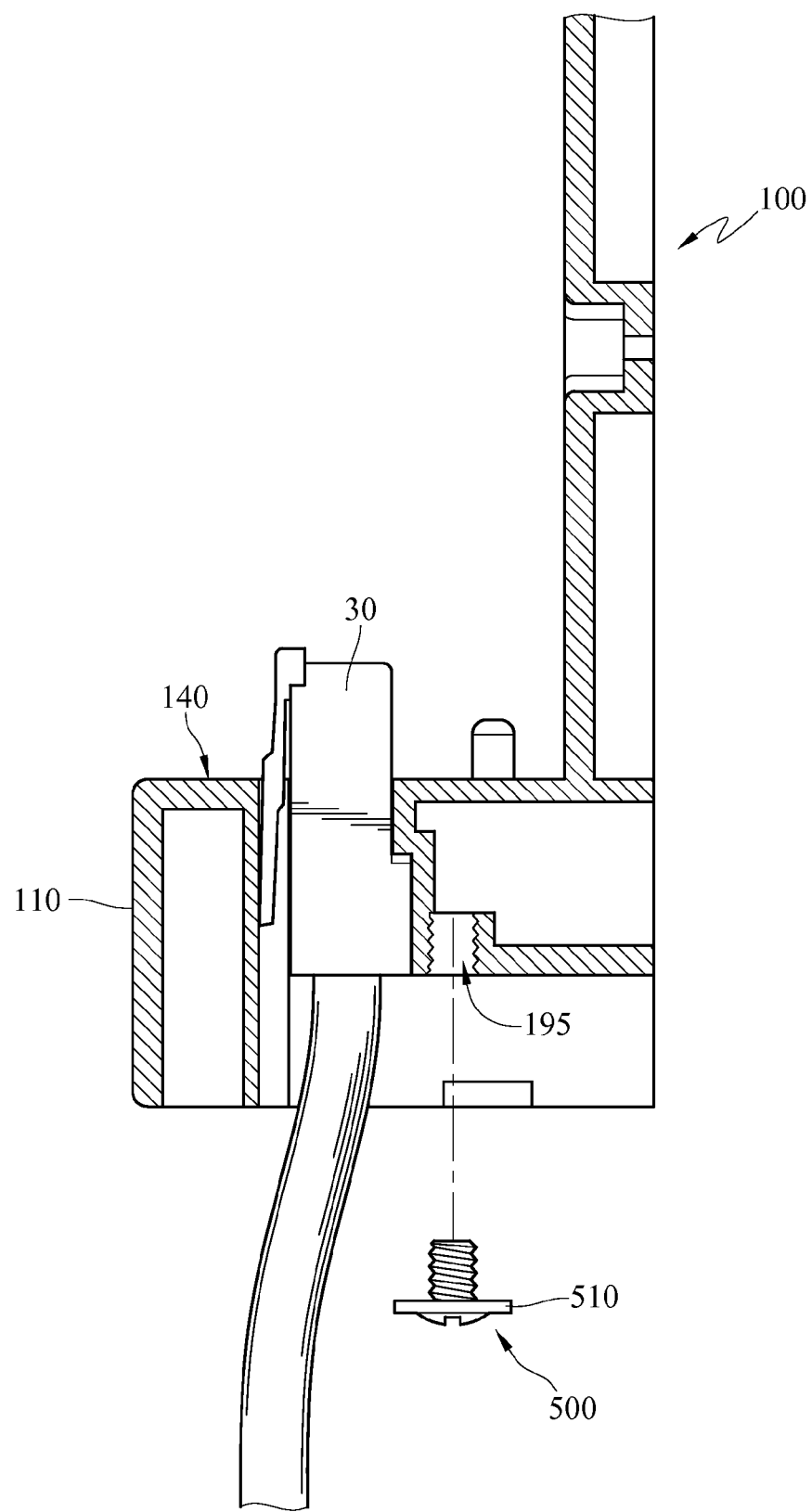
FIG. 6B is an exploded view of FIG. 6A.

Nonetheless, in other embodiments, the fixing method of the cable 30 is not limited to the fastening member 170. Referring to FIG. 6A and FIG. 6B, FIG. 6A is a sectional view of a support stand according to another embodiment of the disclosure; FIG. 6B is an exploded view of FIG. 6A. In this embodiment, the support stand 110 has a screwing hole 195, and the base 100 further comprises a locking member 500. The locking member 500 has an annular flange 510. The locking member 500 is screwed into the screwing hole 195, so as to make the annular flange 510 of the locking member 500 lean against the cable 30 (as shown in FIG. 6A). Thereby, the relative position of the cable 30 and the support stand 110 is fixed.

As seen in FIG. 3, in this embodiment, the support stand 110 comprises a wire-arrangement recess 180. The wire-arrangement recess 180 is configured for accommodating a part of the cable 30. The wire-arrangement recess 180 is communicated with the through hole 150. The wire-arrangement recess 180 has two openings 181. The two openings 181 are located on the lateral surface and the bottom surface of the support stand 110 respectively, so that the cable 30 can be directed out of the lateral surface or the bottom surface of the support stand 110, through the openings 181. Thereby, the support stand 110 can be placed not only on the wall but also on the table.

Figure 7A:
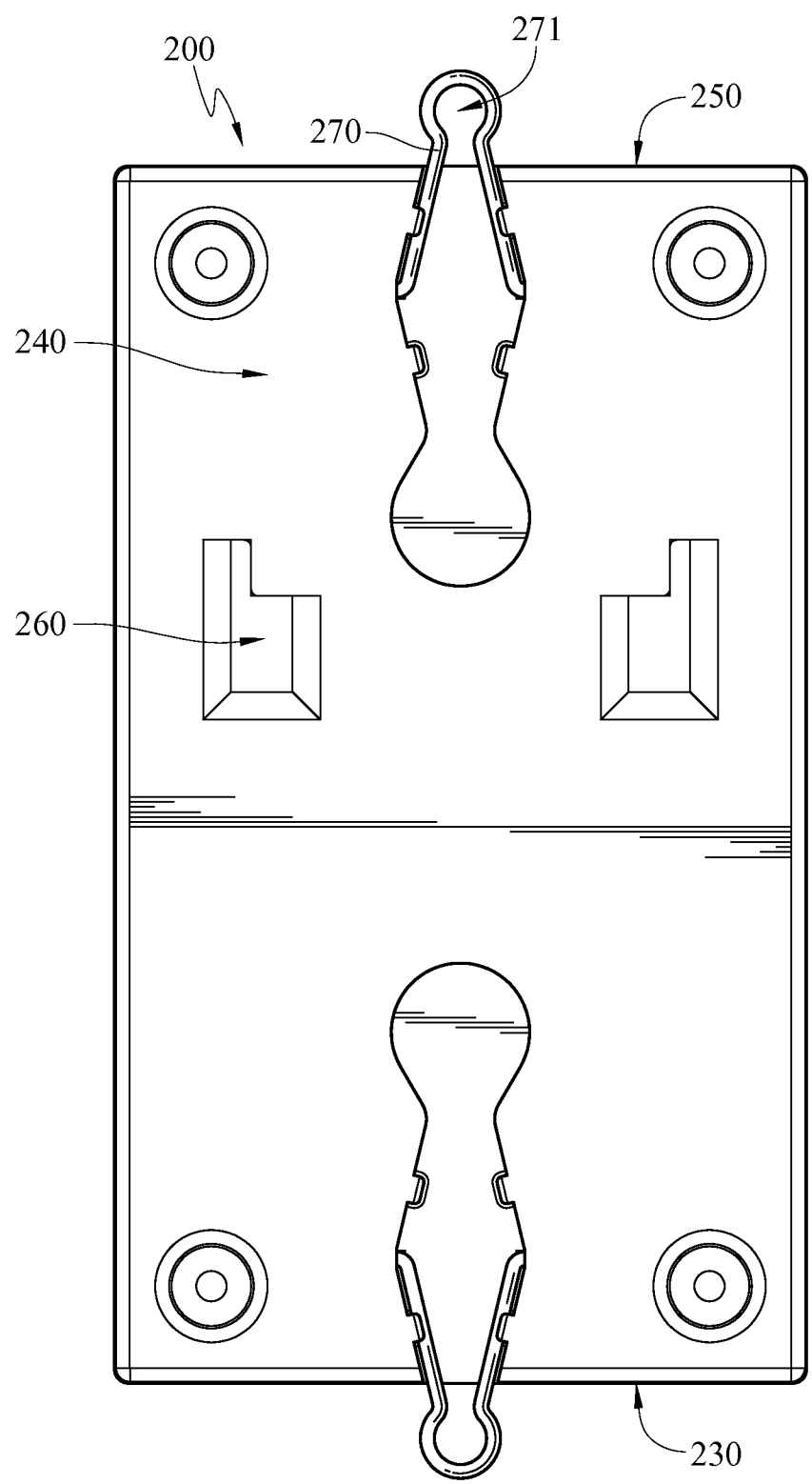
FIG. 7A and FIG. 7B are schematic views of the movement of the hanging member of the camera in FIG. 1.
Figure 7B:
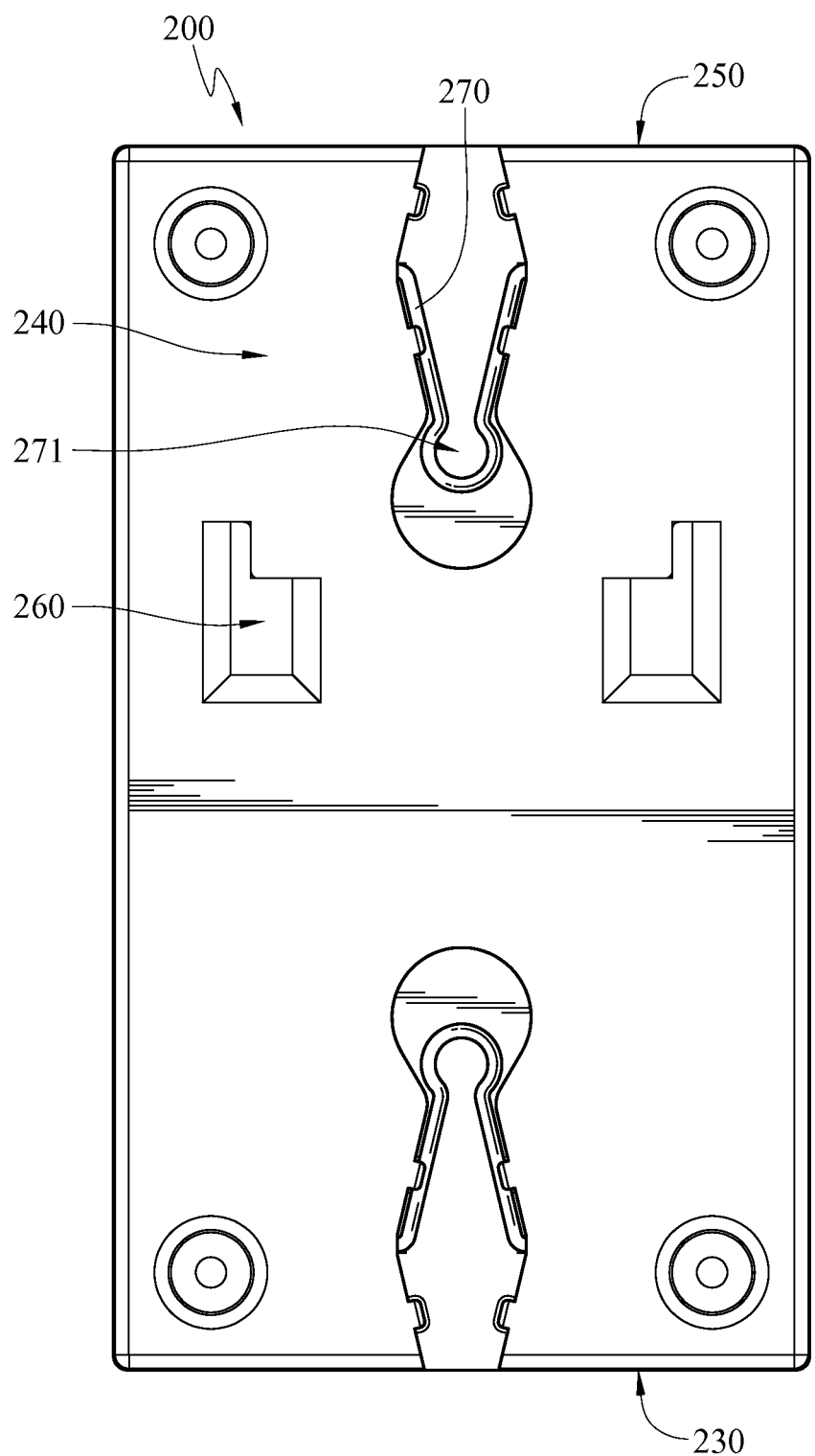

Furthermore, referring to FIG. 2, FIG. 7A and FIG. 7B, FIG. 7A and FIG. 7B are schematic views of the movement of the hanging member of the camera in FIG. 1. In this embodiment, the video surveillance component 10 further has two hanging members 270. The two hanging members 270 are pivotally disposed on the case 210. The two hanging members 270 are located on the installation surface 240, and are near the top surface 250 and the bottom surface 230 respectively. Each of the two hanging members 270 is configured for pivoting relative to the case 210 and therefore has a using position and a storage position. Each of the two hanging members 270 has a hanging hole portion 271. When the case 210 is separated from the base 100 and the two hanging member 270 are at the using position (as shown in FIG. 7A), one of the two hanging hole portions 271 protrudes from the top surface 250, while the other of the two hanging hole portions 271 protrudes from the bottom surface 230. When the two hanging member 270 are at the using position, the two hanging hole portions 271 can be used for screwing, so that the camera 200 can be hung on the wall without the base 100. When the two hanging member 270 are at the storage position (as shown in FIG. 7B), the two hanging hole portions 271 are attached to the installation surface 240. That is, when the two hanging member 270 are stored, the two hanging member 270 do not protrude from the bottom surface 230 and the top surface 250, so that the camera 200 can be assembled to the base 100.

Figure 8:
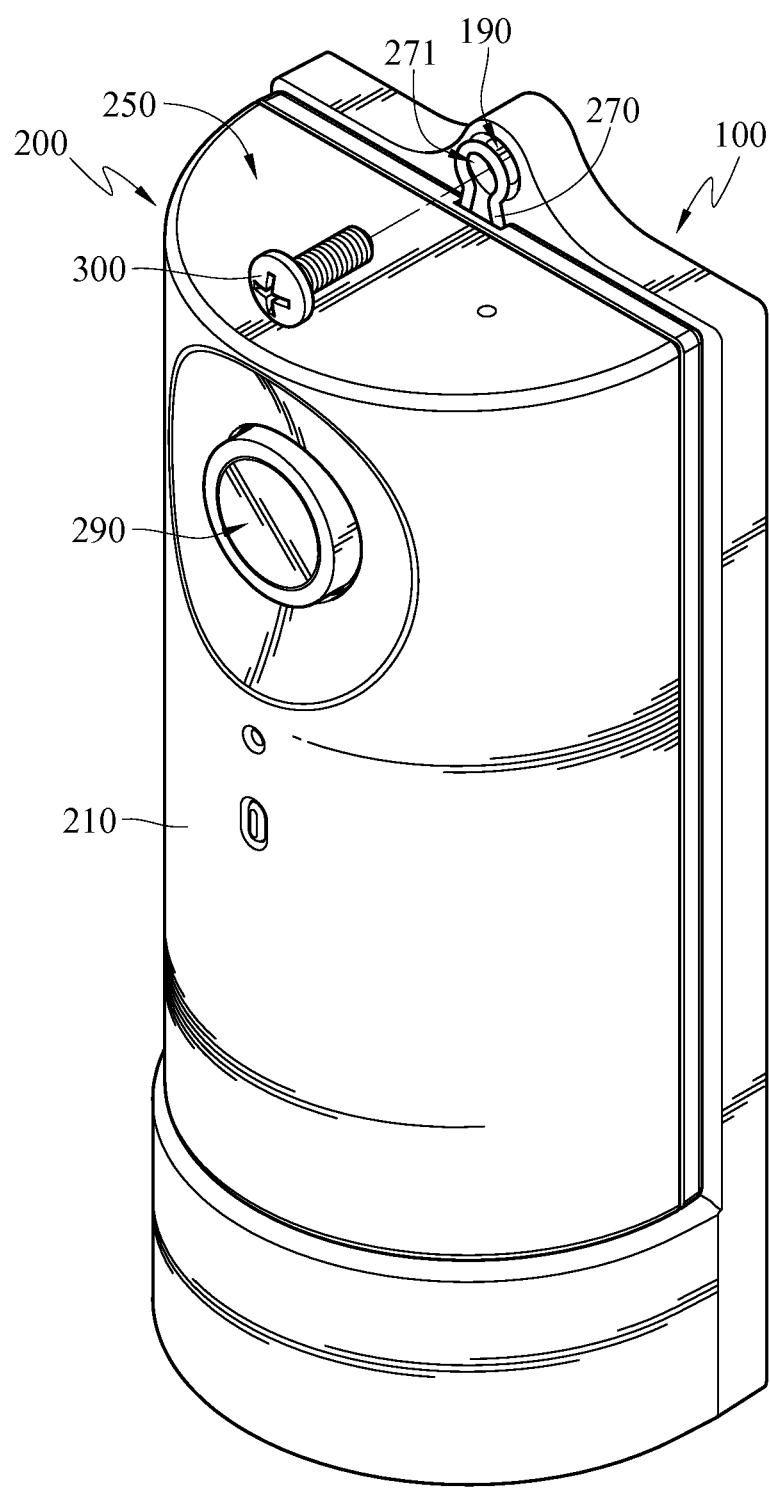
FIG. 8 is a schematic view of the usage of the video surveillance component in FIG. 1.

Moreover, there is another purpose for the hanging member 270 of this embodiment. Referring to FIG. 8, FIG. 8 is a schematic view of the usage of the video surveillance component in FIG. 1. In this embodiment, the back plate 120 has a locking hole 190. When the hanging member 270 near the top surface 250 is at the using position and the camera 200 is installed on the base 100, the hanging hole portion 271 aims at the locking hole 190. Assemblers can utilize a locking member 300 to run through the hanging hole portion 271 and the locking hole 190, so as to lock the case 210 of the camera 200 to the back plate 120. Thereby, this prevents the camera 200 from falling off the base 100, or even prevents the camera 200 from being stolen.

Figure 9:
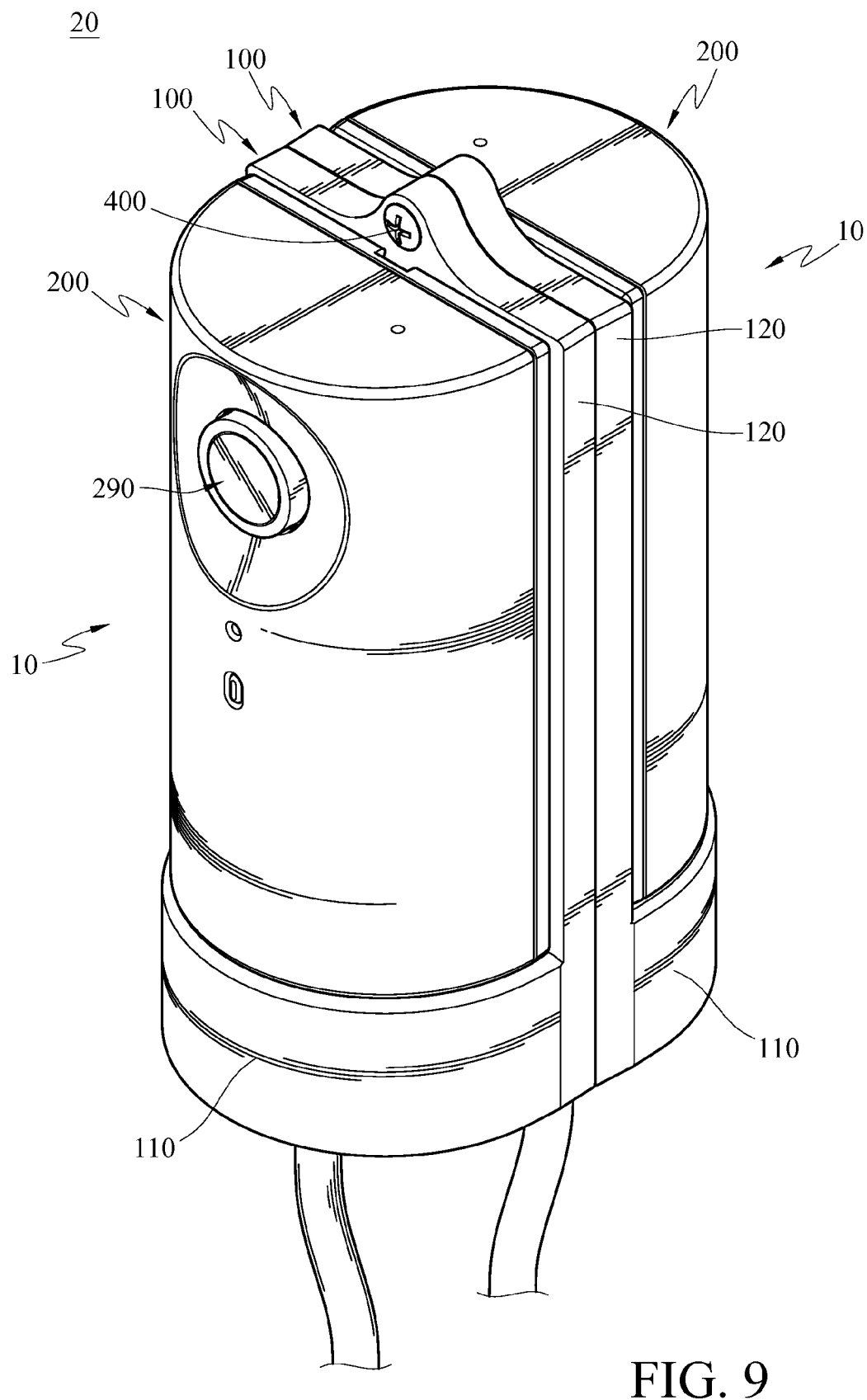
FIG. 9 is a perspective view of a video surveillance assembly according to another embodiment of the disclosure.

In other embodiments, users can assemble the two video surveillance components together to expand the field of view. Referring to FIG. 1, FIG. 2 and FIG. 9, FIG. 9 is a perspective view of a video surveillance assembly according to another embodiment of the disclosure. Since the embodiment of FIG. 9 is similar to that of FIG. 1, only the difference is illustrated for the sake of conciseness.

The video surveillance assembly 20 of this embodiment comprises the two video surveillance components 10. Each of the two video surveillance components 10 comprises a base 100 and a camera 200. The base 100 has a back plate 120. The two back plates 120 of the two bases 100 are attached to each other to make the field of view of the two cameras 200 be or be not overlapped, so as to expand the field of view of the video surveillance assembly 20. Specifically, when the field of view of the two cameras 200 are greater than 180 degrees and the sides of the field of view are overlapped, the video surveillance assembly 20 is configured for 360-degree surveillance. In this embodiment, the two back plates 120 are screwed up by screws 400 so that the two back plates 120 are attached to each other, but the disclosure is not limited thereto. In other embodiments, the two back plates 120 can be connected by magnets.

Figure 10:
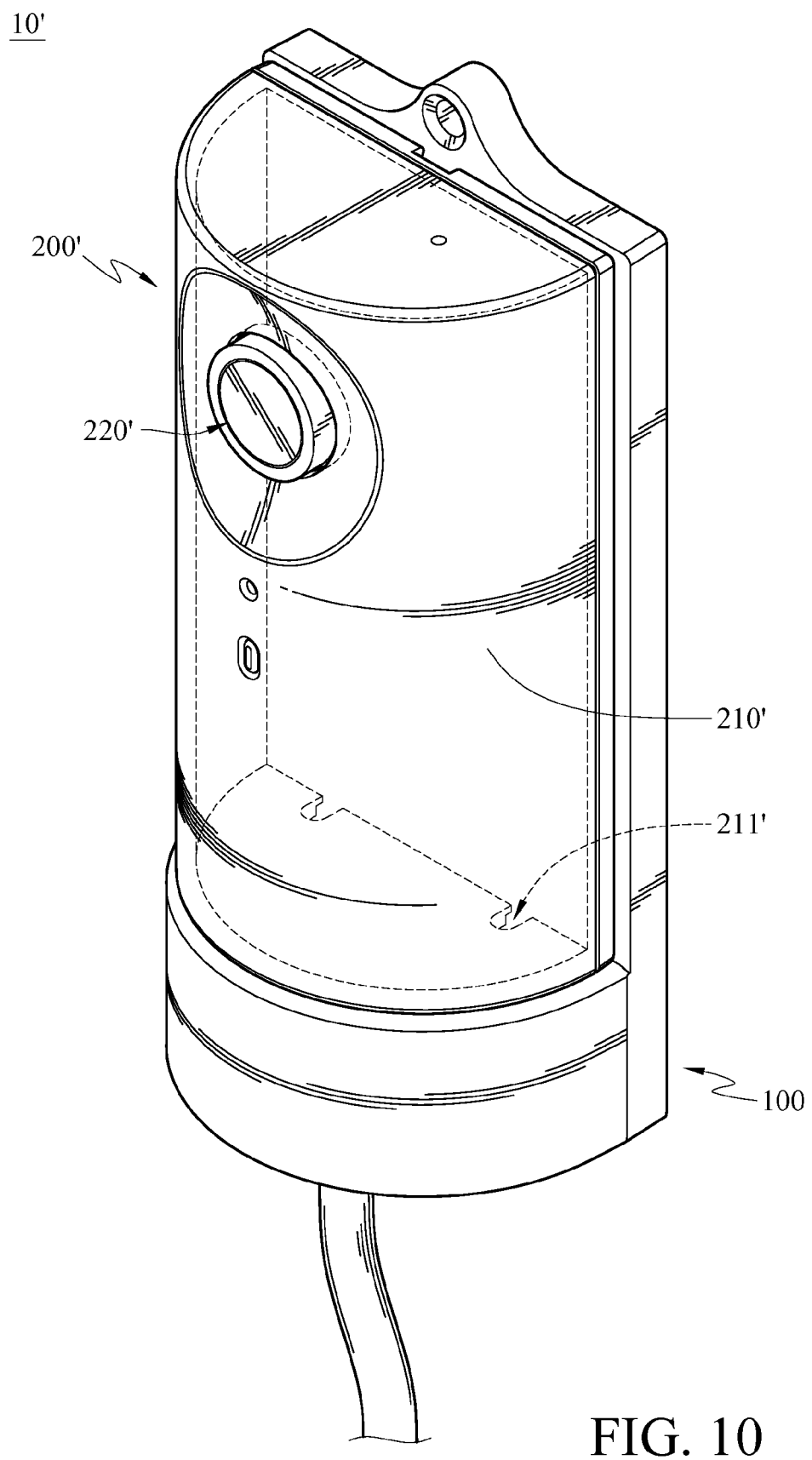
FIG. 10 is a perspective view of a video surveillance component according to the fourth embodiment of the disclosure.
Figure 11:
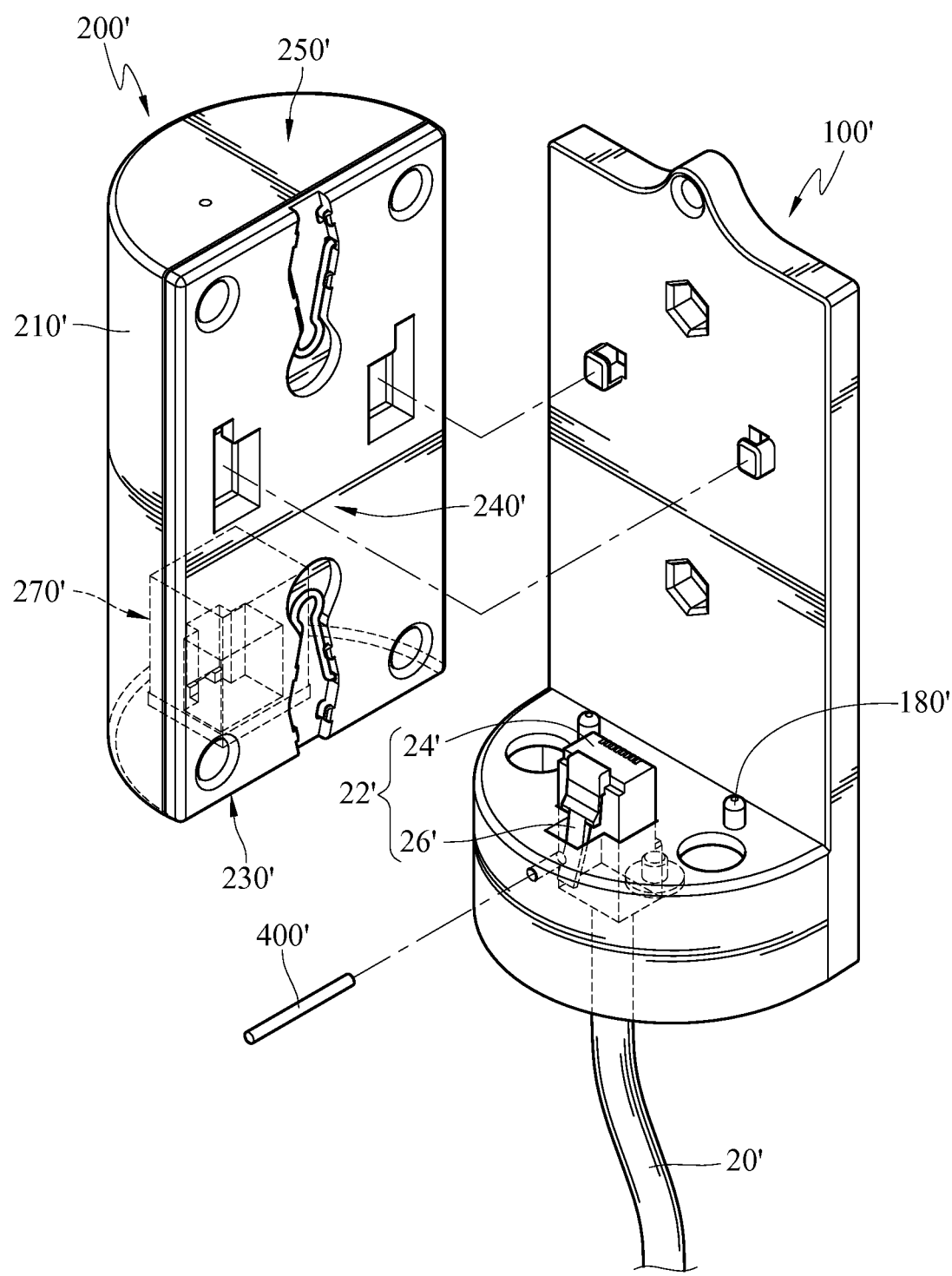
FIG. 11 is an exploded view of FIG. 10.
Figure 12:
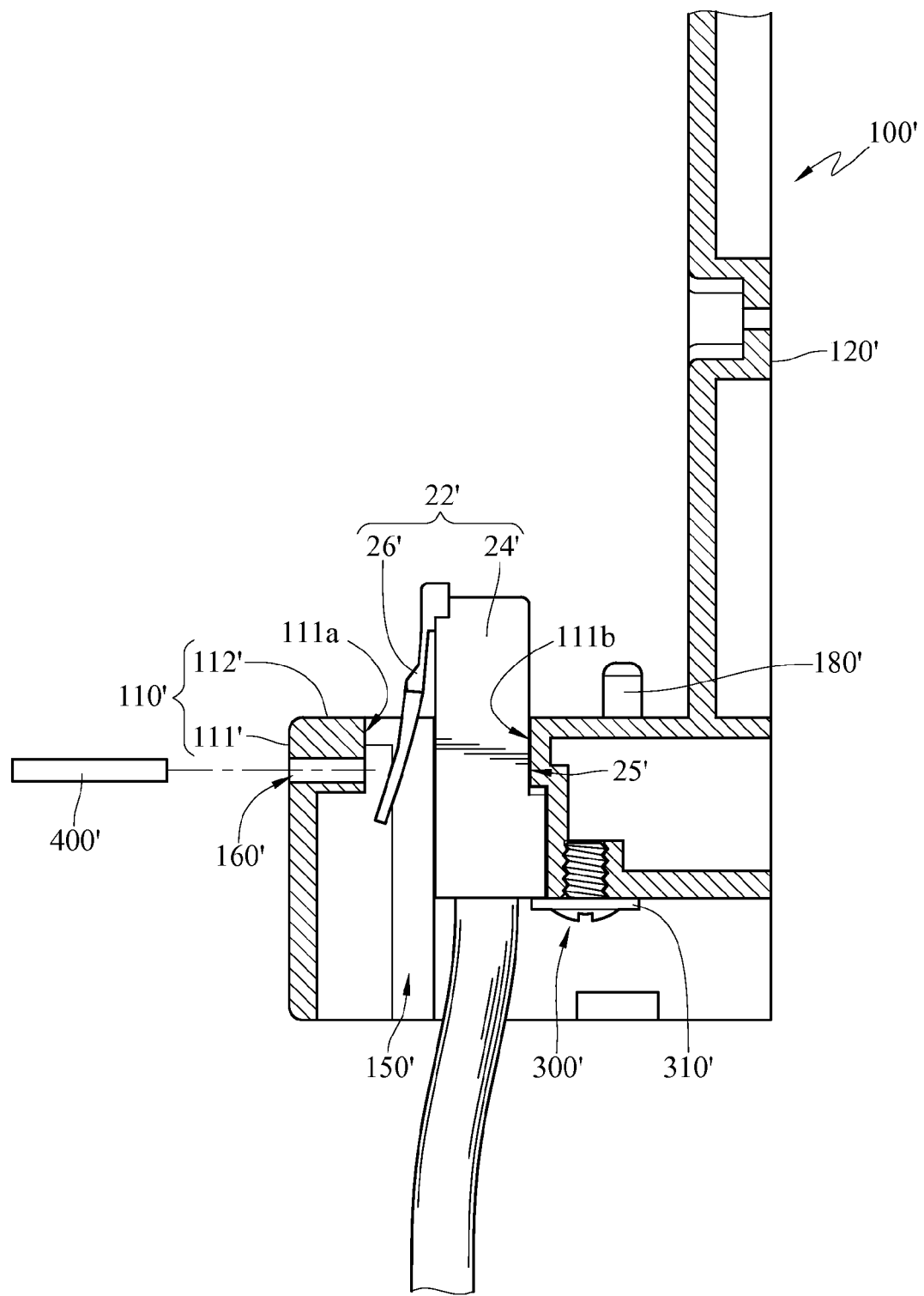
FIG. 12 is a sectional view of the base in FIG. 10.
Figure 13:
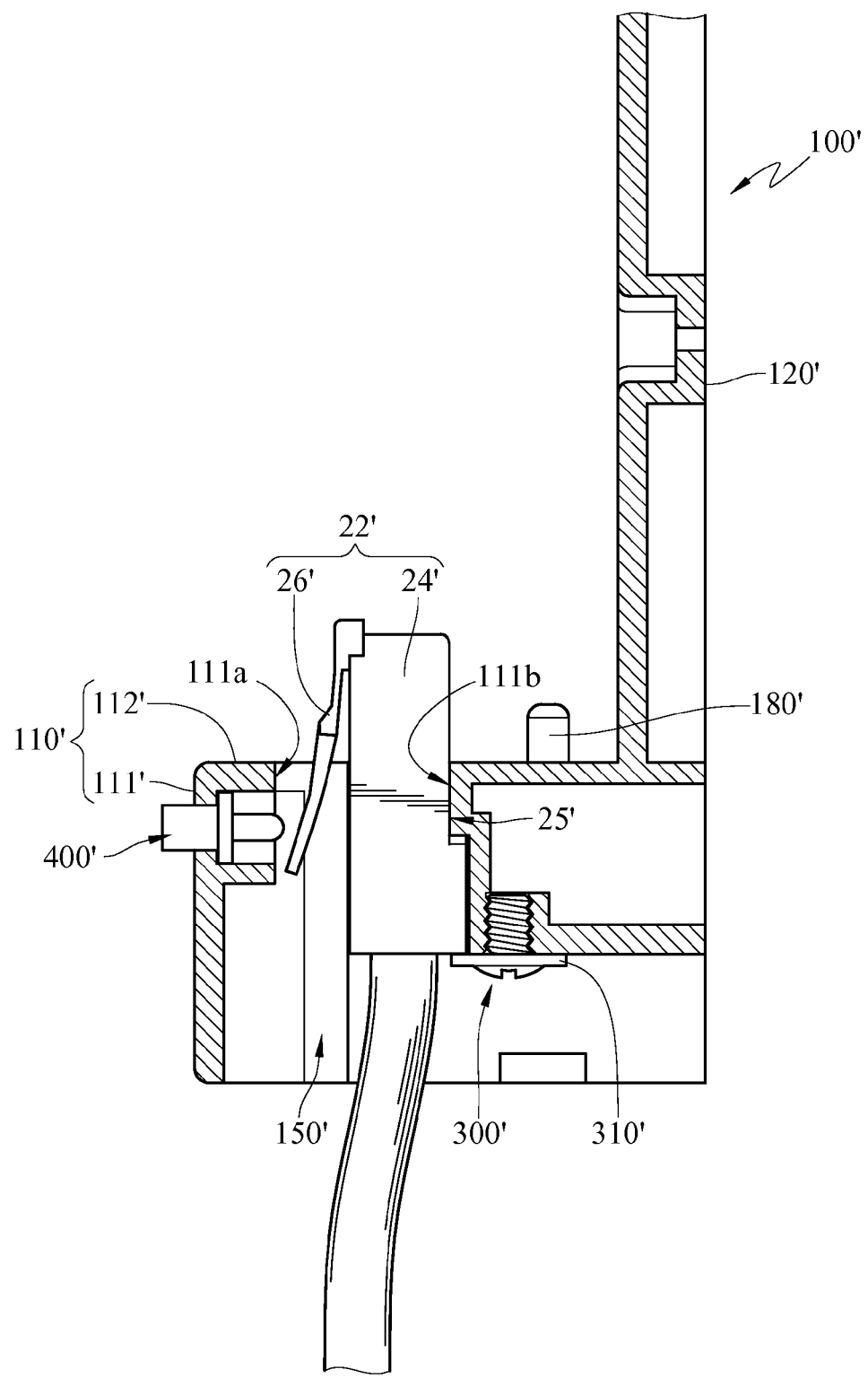
FIG. 13 is a sectional view of the base according to the fifth embodiment of the disclosure.

Referring to FIG. 10 to FIG. 13, FIG. 10 is a perspective view of a video surveillance component according to the fourth embodiment of the disclosure; FIG. 11 is an exploded view of FIG. 10; FIG. 12 is a sectional view of the base in FIG. 10; and FIG. 13 is a sectional view of the base according to the fifth embodiment of the disclosure. The embodiments of FIG. 10 and FIG. 13 are similar to the embodiments set forth before, so only the differences are illustrated.

The video surveillance component 10' of this embodiment is configured for a cable 20' plugged thereon. The cable 20' comprises a connector 22'. The connector 22' comprises a main body 24' and a fastening tab 26'. The main body 24' has a contact surface 25'. One end of the fastening tab 26' is connected to one side, opposite to the contact surface 25', of the main body 24'. The cable 20' is a network cable. The types of the network cable include the round wire and the flat wire which correspond to two types of the connector 22' respectively. However, the disclosure is not limited thereto.

A video surveillance component 10' comprises a base 100' and a camera 200'. The base 100' comprises a support stand 110' and a back plate 12'. The support stand 110' comprises a support plate 111' and a lateral plate 112'. Furthermore, the base 100' has a through slot 150' and a release hole 160'. The through slot 150' penetrates the support plate 111'. The support plate 111' has a first end surface 111a and a second end surface 111b which form the through slot 150'. The first end surface 111a is nearer to the release hole 160' than the second end surface 111b. The fastening tab 26' of the connector 22' faces the first end surface 111b, while the contact surface 25' of the connector 22' faces the second end surface 111b. The maximum distance between the fastening tab 26' and the contact surface 25' is less than the distance between the first end surface 111a and the second end surface 111b, but this is not intended to limit the disclosure. In other embodiments, the maximum distance between the fastening tab 26' and the contact surface 25' may be greater than or equal to the distance between the first end surface 111a and the second end surface 111b.

The through slot 150' is configured for disposing the connector 22'. Specifically, the video surveillance component 10' further comprises a locking member 300'. The locking member 300' has an annular flange 310'. The locking member 300' is disposed on the support stand 110' in a detachable manner. The annular flange 310' of the locking member 300' pushes the bottom edge of the connector 22', so as to make a part of the connector 22' be fixed to a place between the support plate 111' and the annular flange 310', and to make the other part of the connector 22' protrude from the support plate 111'.

The release hole 160' penetrates from the surface, which forms the through slot 150', of the base 100' to the external surface of the base 100'. In this embodiment, the release hole 160' penetrates from the internal surface of the lateral plate 112' to the external surface of the lateral plate 112'. Moreover, the support stand 110' further comprises two locating pins 180'. The locating pin 180' is disposed on the support plate 111'. The back plate 120' is erected on the support plate 111'.

A camera 200' is disposed on the base 100' in a detachable manner. The camera 200' comprises a case 210', a camera lens module 220' and a connecting member 270'. The shape of the case 210' is a semicylinder as an example. The case 210' has a bottom surface 230', an installation surface 240' and a top surface 250' all connected to each other. The bottom surface 230' and the top surface 250' are respectively connected to the opposite sides of the installation surface 240'. The case 210' further comprises two locating holes 211' corresponding to the two locating pins 180' of the support stand 110'. The locating hole 211' is located on the bottom surface 230'. The locating pin 180' is plugged in the locating hole 211', so as to lead the camera 200' to be installed on the support stand 100'.

The camera lens module 220' is installed in the case 210'. It is possible that a part of the camera lens module 220' or all of the camera lens module 220' are inside the case 210'. The connecting member 270' is disposed on the case 210' and is electronically connected to the camera lens module 220'. The connecting member 270' comprises a fastening portion 271'. The connecting member 270' is detachably connected to the connector 22', and the fastening portion 271' is configured for buckling with the fastening tab 26'.

As seen in FIG. 12, in this embodiment, the video surveillance component 10' further comprises a release member 400'. The release member 400' is, for example, a slender object. The release member 400' and the support stand 110' are separated from each other. The release member 400' is movable disposed on the release hoe 160' and therefore has a fastening position and a release position. When the release member 400' is at the fastening position, the release member 400' leaves the fastening tab 26, so as to make the fastening tab 26' close to the release hole 160'. When the release member 400' is at the release position, the release member 400' pushes the fastening tab 26', so as to make the fastening tab 26' be away from the release hole 160. Thereby, the fastening relationship between the fastening tab 26' of the connector 22' and the fastening portion 271' of the connecting member 270' is released.

In the embodiment of FIG. 12, the release member 400' is not disposed on the support stand 110', but the disclosure is not limited thereto. In other embodiments, the release member 400' may be disposed on the support stand 110'. As seen in FIG. 13, the release member 400' is a button, while the release member 400' is movably disposed on the release hole 160' of the lateral plate 112' and therefore has the fastening position and the release position.

Figure 14:
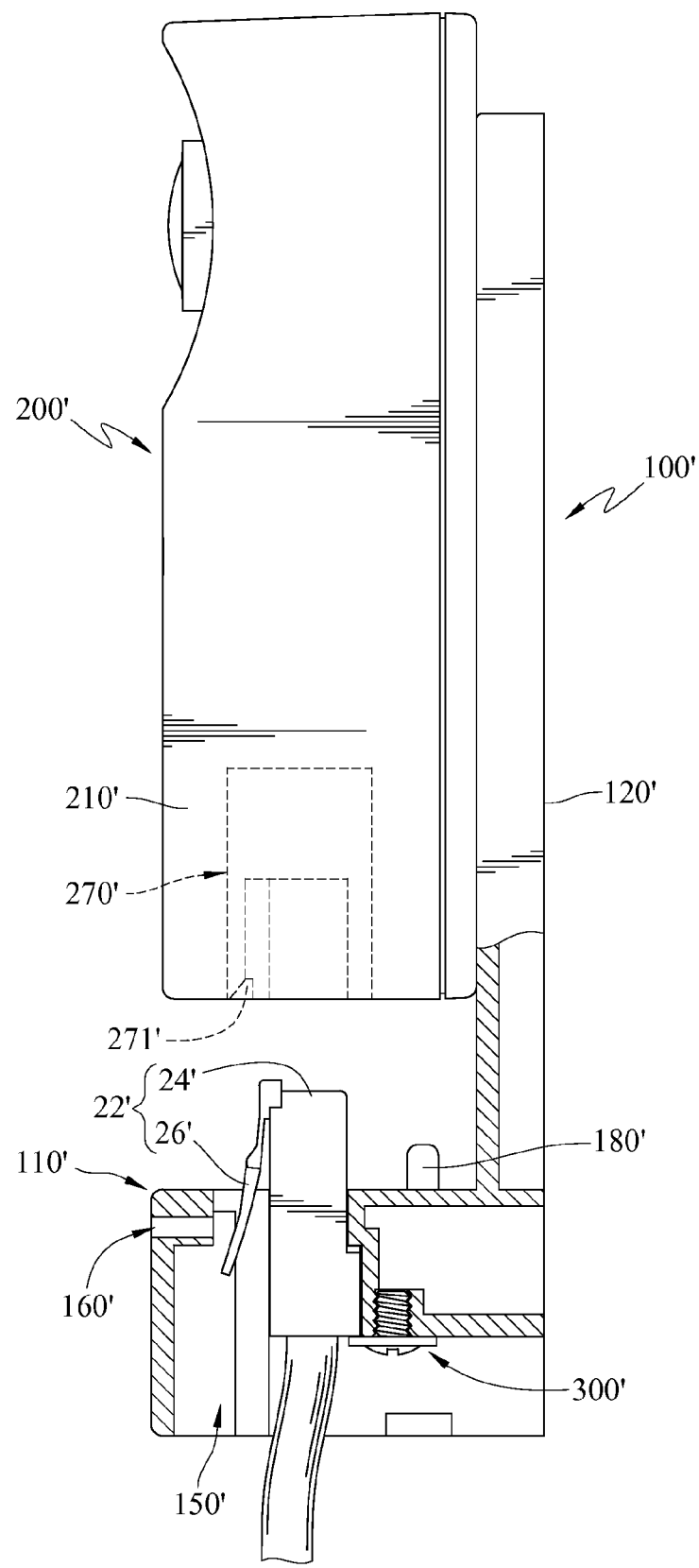
FIG. 14 to FIG. 16 are sectional views of the assembly and disassembly of the components in FIG. 10.
Figure 15:
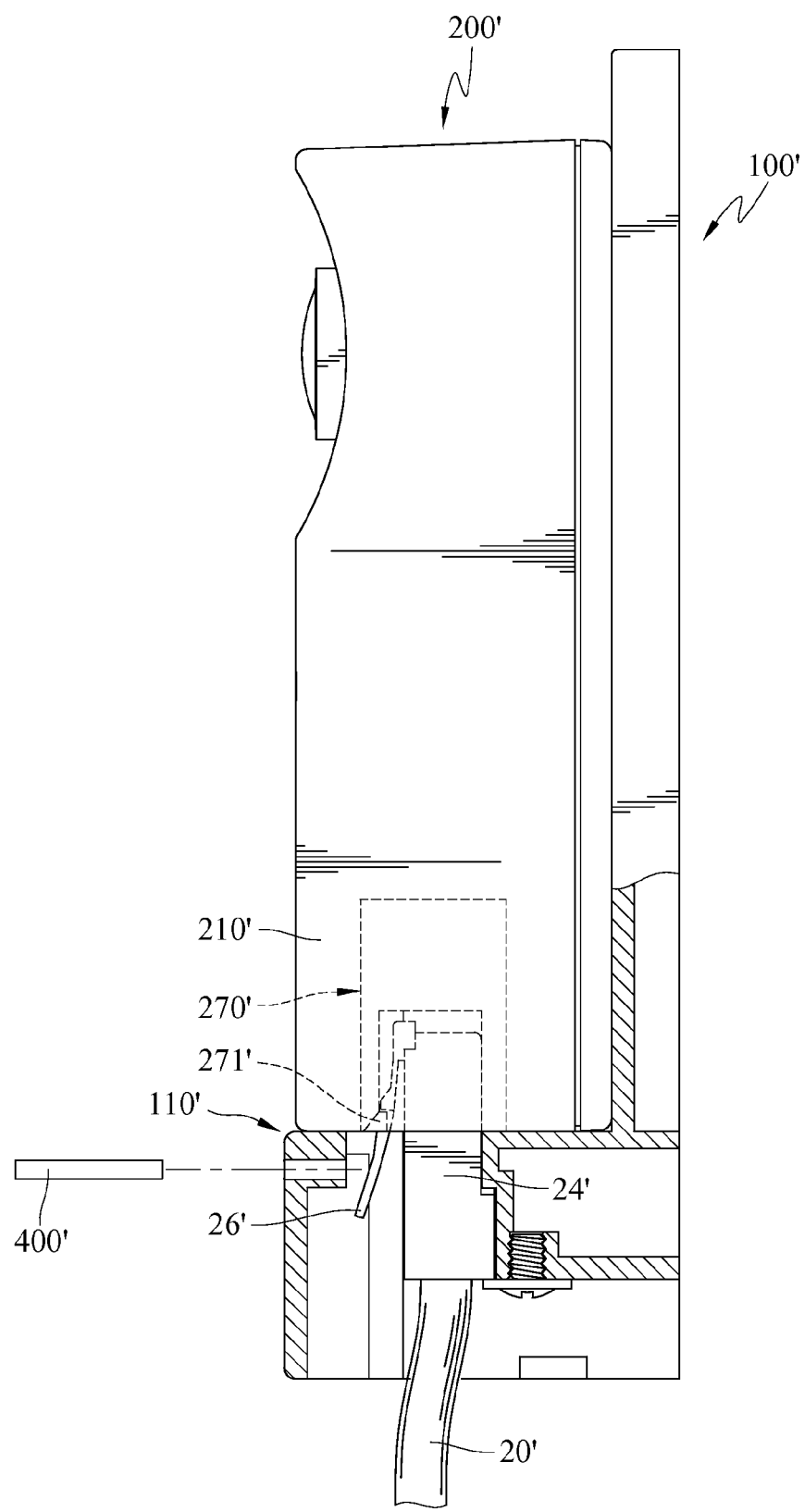
Figure 16:
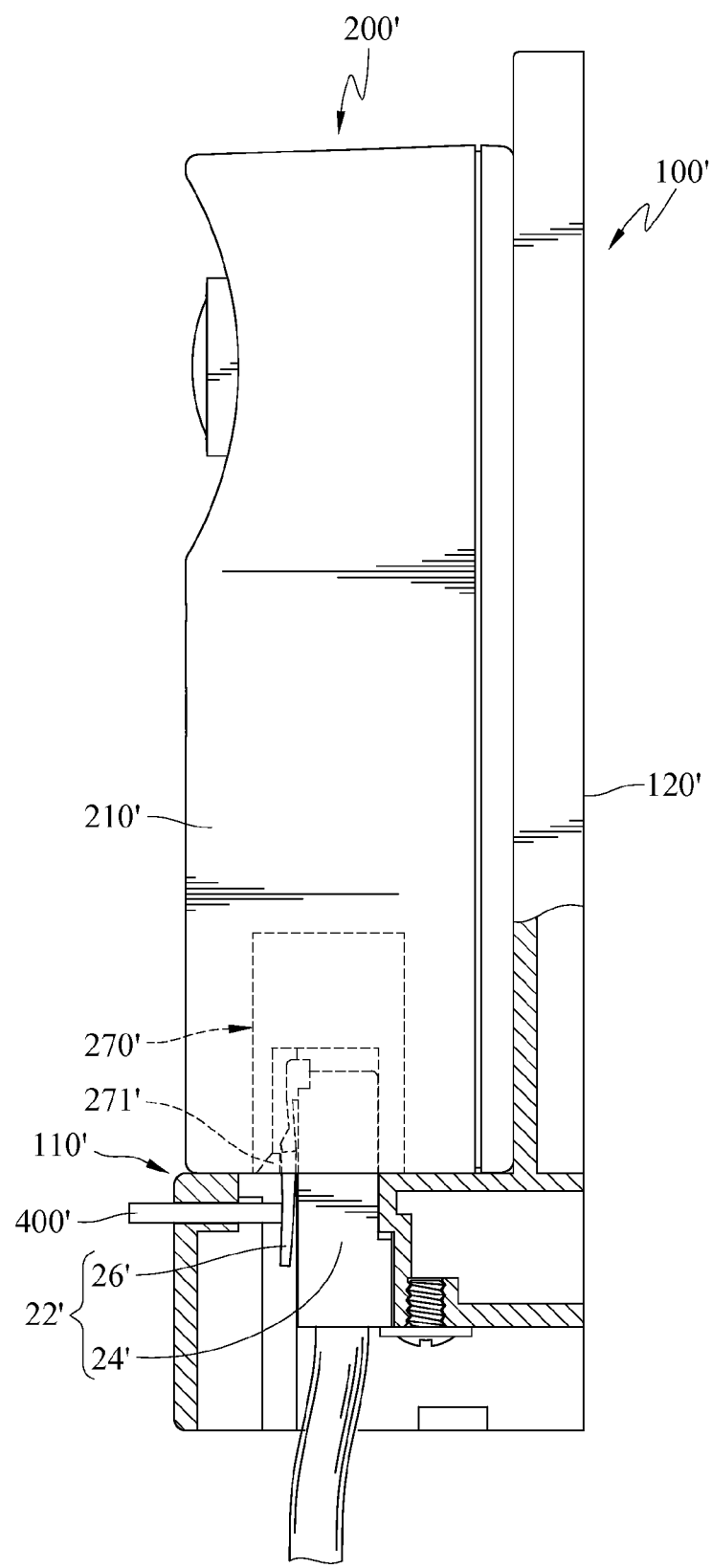

Firstly, when the cable 20' is the round wire, the assembly and disassembly of the video surveillance component 10' are set forth below. Referring to FIG. 14 to FIG. 16, which are sectional views of the assembly and disassembly of the components in FIG. 10. At first, as seen in FIG. 14, the base 100' and the camera 200' are separated from each other. Subsequently, as seen in FIG. 15, the camera 200' is installed on the base 100', so that the two locating pins 180' are plugged in the locating holes 211' respectively and the fastening tab 26' of the connector 22' and the fastening portion 271' of the connecting member 270' are fastened together. Since it will sound when the fastening tab 26' is completely fastened with the fastening portion 271', the users are able to know the connector 22' is completely electronically connected to the connecting member 270'. Thereby, this can avoid that the connecting member 270' is not completely electronically connected to the connector 22', which affects the surveillance quality negatively. Then, as seen in FIG. 16, when the change or the disassembly of the camera 200' is required, the release member 400' can be plugged into the release hole 160', so as to make the release member 400' push the fastening tab 26', thereby releasing the fastening relationship between the fastening tab 26' and the fastening portion 271'.

Figure 17:
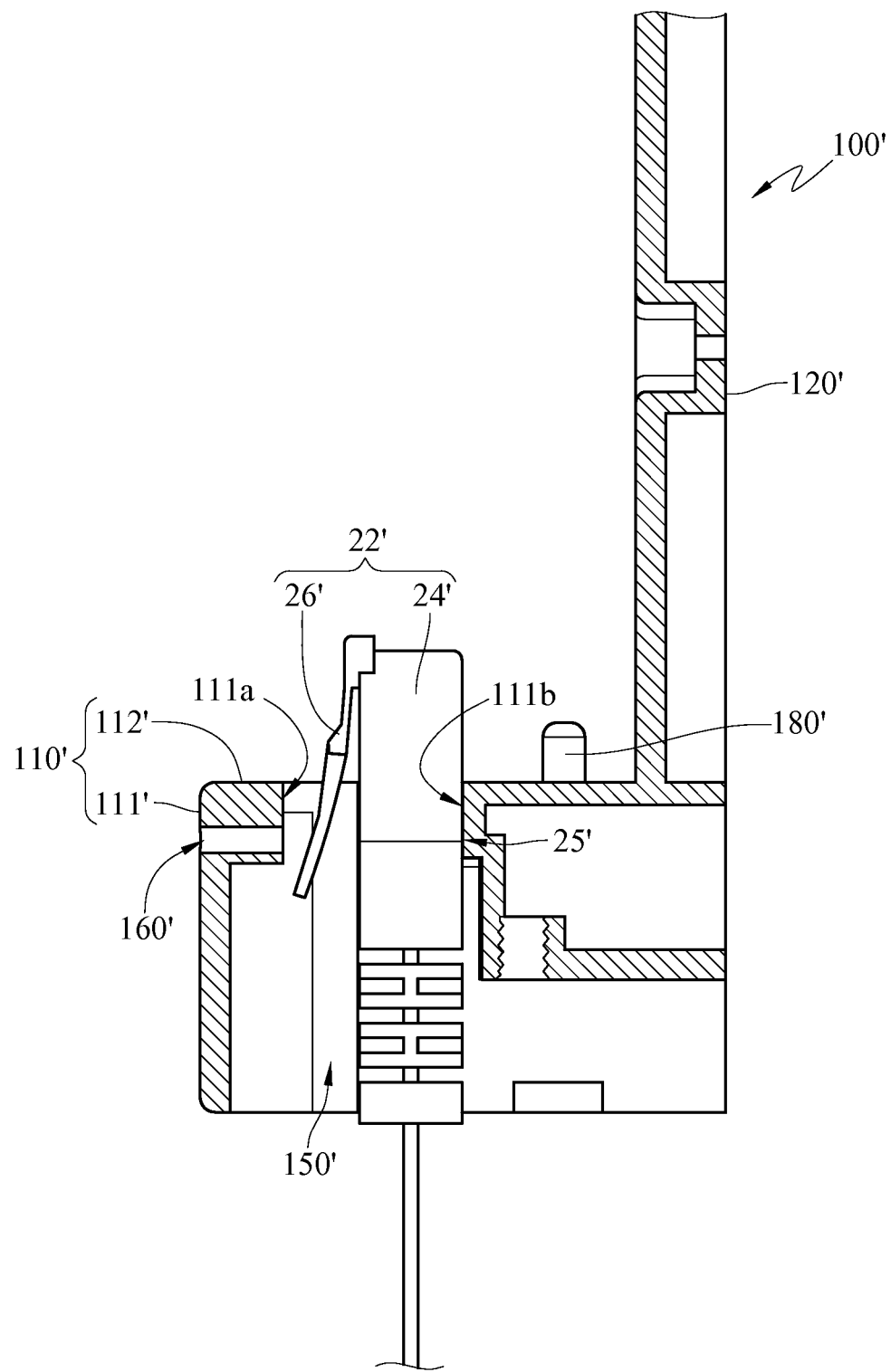
FIG. 17 is a sectional view of the base with a cable installed thereon according to the sixth embodiment of the disclosure.
Figure 18:
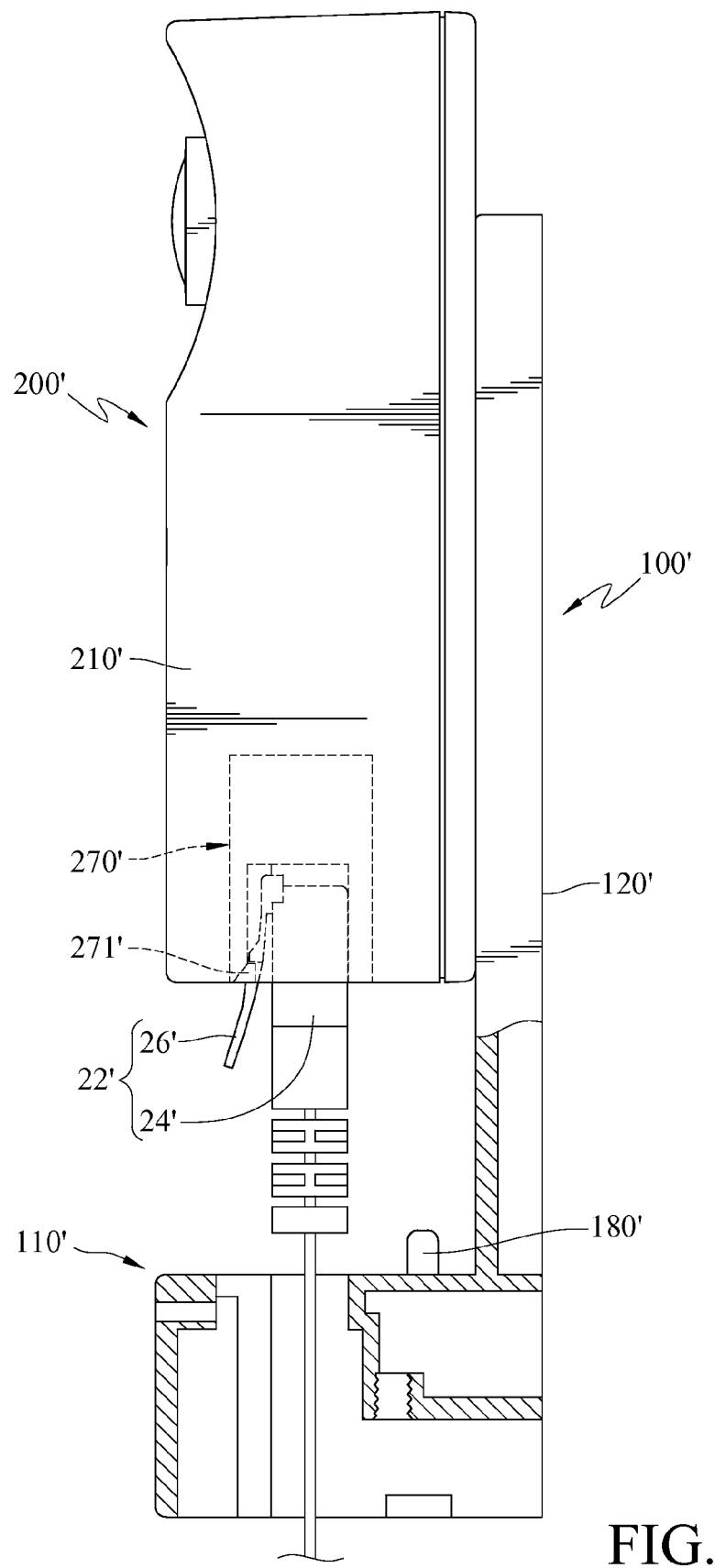
FIG. 18 and FIG. 19 are schematic views of the disassembly of the components in FIG. 17.
Figure 19:
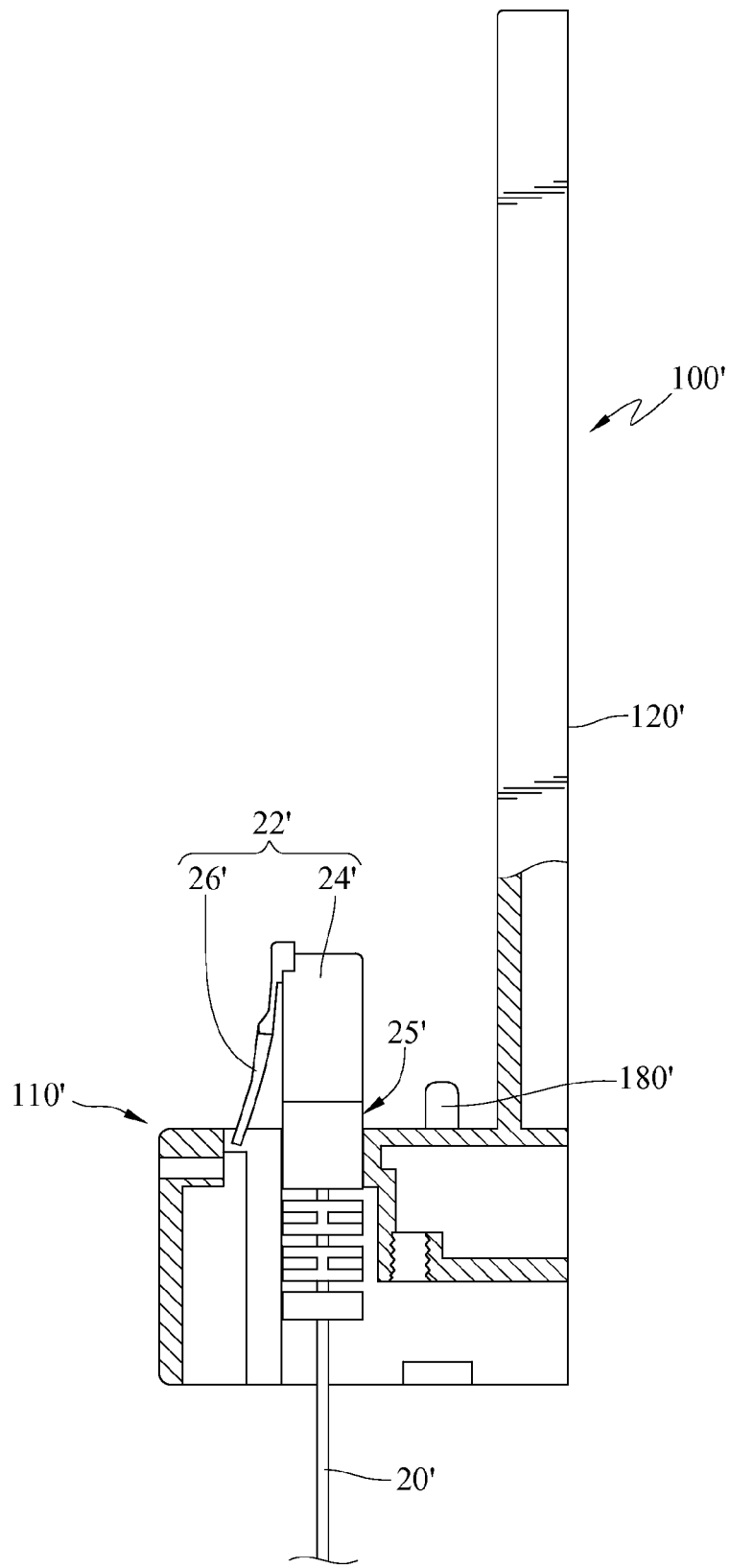

Secondly, when the cable 20' is the flat wire, the assembly and disassembly of the video surveillance component 10' are set forth below. The assembly and disassembly process changes as the type of the cable 20' changes from the round wire to the flat wire. Referring to FIG. 17 to FIG. 19, FIG. 17 is a sectional view of the base with a cable installed thereon according to the sixth embodiment of the disclosure; and FIG. 18 and FIG. 19 are schematic views of the disassembly of the components in FIG. 17. As seen in FIG. 17, since the connector 22' of the cable 20' in the flat wire type cannot be fastened with the base 100'. Thus, the connector 22' is merely inside the through slot 150' and is electronically connected to the corresponding connecting member 270' of the camera 200'. As seen in FIG. 18, when separating the camera 200' from the base 100', the connector 22' moves away from the base 100' along with the camera 200'. As seen in FIG. 19, when a user removes the cable 20', since the maximum distance between the fastening tab 26' and the contact surface 25' is less than that between the first end surface 111*a* and the second end surface 111*b*, the fastening tab 26' of the connector 22' is not interfered with the base 100 and thereby can run through the through slot 150'.

Figure 20:
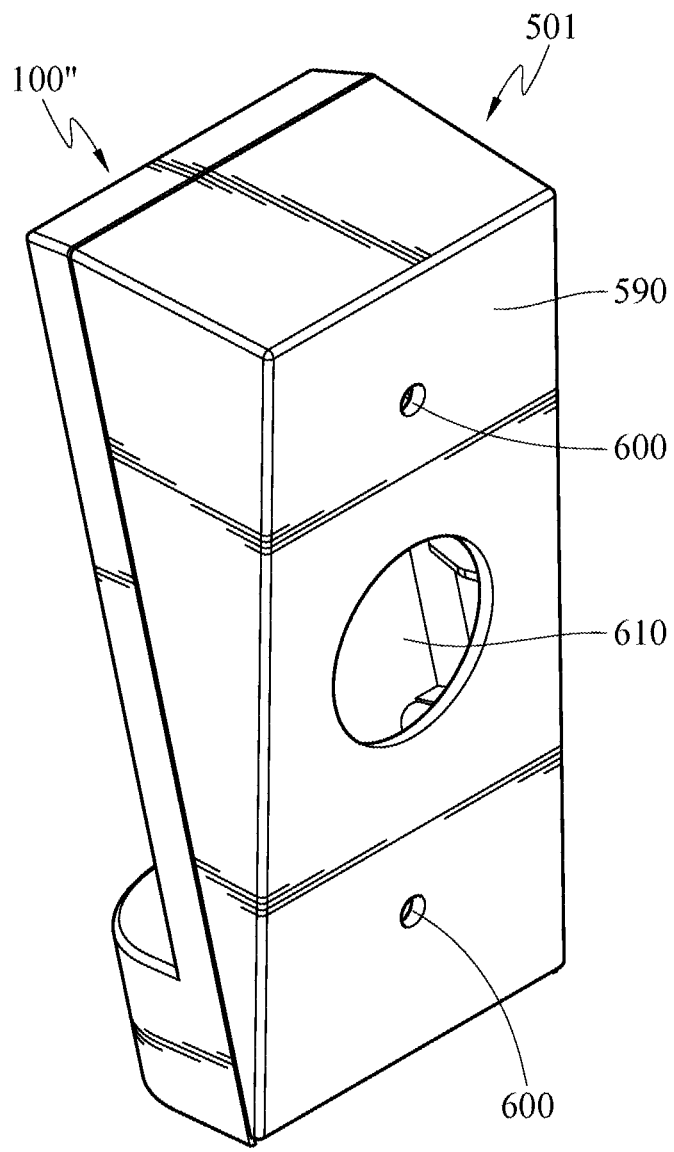
FIG. 20 is a perspective view of a video surveillance component according to still another embodiment of the disclosure.
Figure 21:
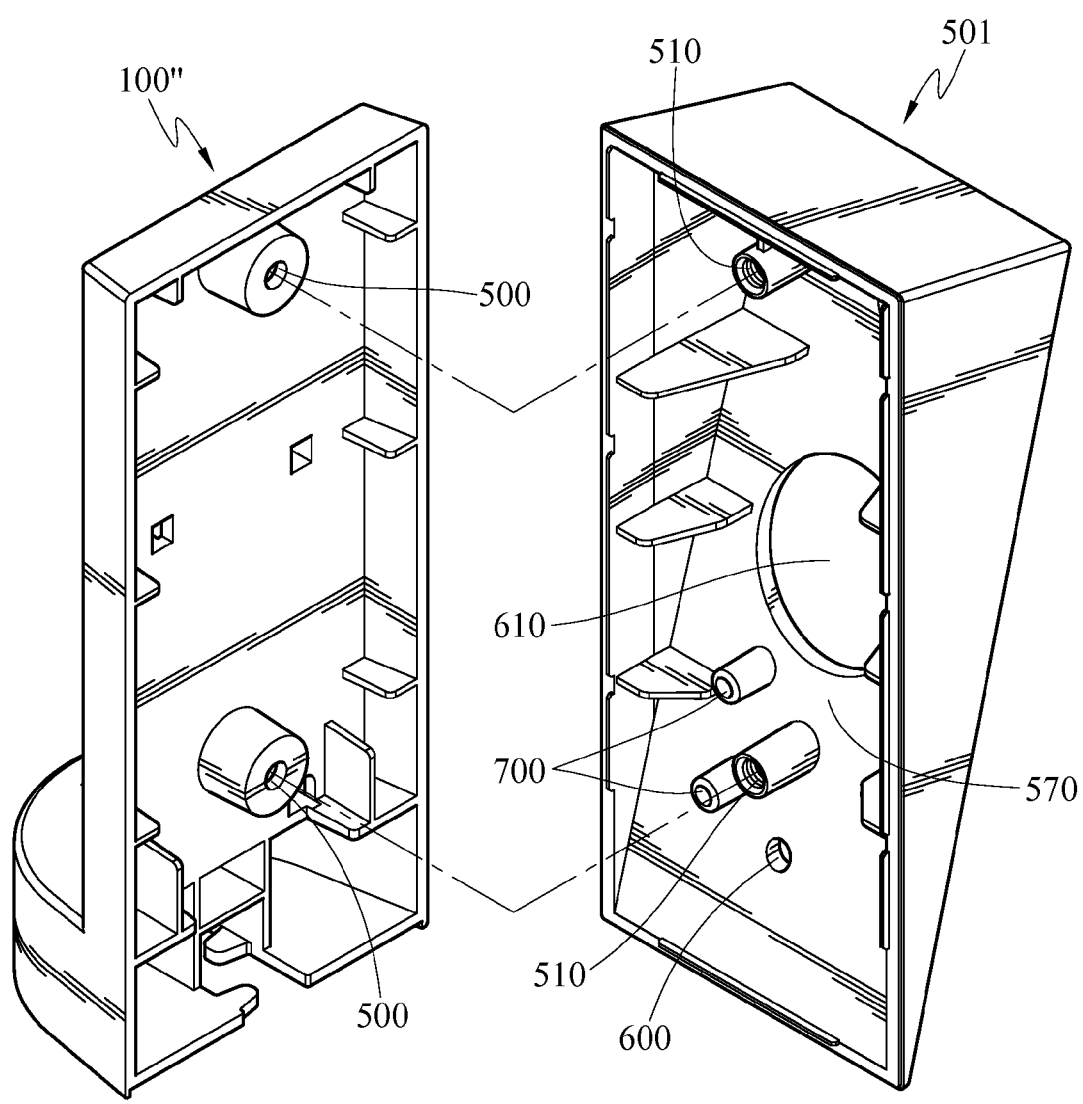
FIG. 21 is an exploded view of FIG. 20.
Figure 22:
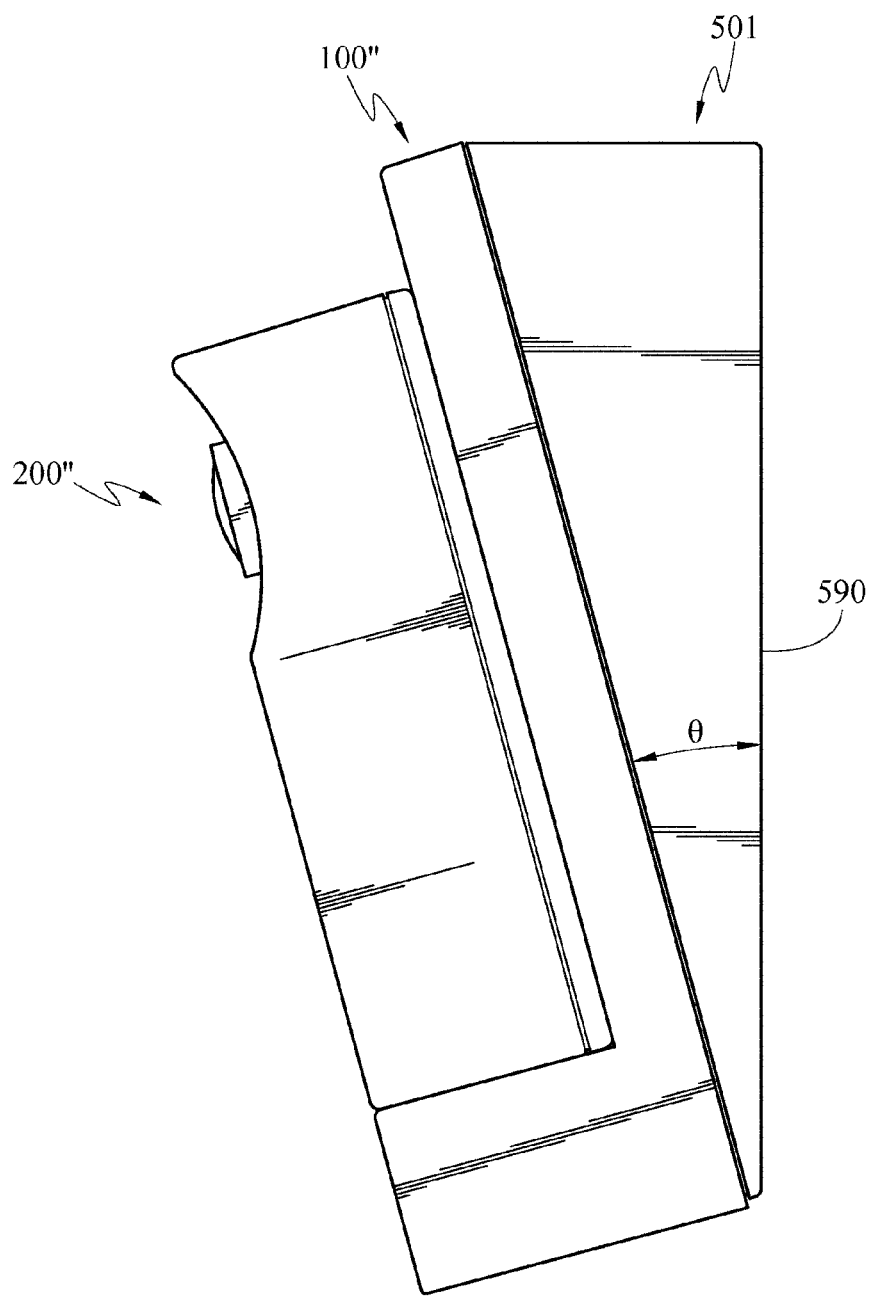
FIG. 22 is a side view of the video surveillance component according to still another embodiment of the disclosure.

The disclosure further provides a video surveillance component according to still another embodiment. Referring to FIG. 20 to FIG. 22, FIG. 20 is a perspective view of a video surveillance component according to still another embodiment of the disclosure; FIG. 21 is an exploded view of FIG. 20; and FIG. 22 is a side view of the video surveillance component according to still another embodiment of the disclosure. The video surveillance component 50 of this embodiment is similar to the video surveillance components 10 and 10' mentioned before, so only the differences are illustrated hereinafter.

The video surveillance component 50 of this embodiment comprises a base 100", a camera 200" and an adjustment base 501. The camera 200" is installed on the base 100". The base 100" has at least one first locking portion 500. The at least one first locking portion 500 are located on one side of the base 100" and are away from the camera 200". In this embodiment, the number of the first locking portion 500 is two, but the disclosure is not limited thereto. In other embodiments, the number of the first locking portion 500 may be one or more than one. The two first locking portions 500 can be locked onto a certain surface so that the video surveillance component 50 can record video in a certain place. In this embodiment, the two first locking portions 500 are designed to match the junction box, which is a container for electrical connections. That is, the two first locking portions 500 can be easily locked onto the junction box.

Furthermore, the video surveillance component 50 comprises an adjustment base 501 having a fixing surface 590 and at least one second locking portions 510. The at least one second locking portions 510 is opposite to the fixing surface 590 and corresponding to the two first locking portions 500. The two first locking portions 500 of the base 100" are locked into the two second locking portions 510, and the base 100" is attached to the adjustment base 501. The number of the second locking portion 510 is not intended to limit the disclosure. In other embodiments, the number of the second locking portion 510 may be one or more than one. The fixing surface 590 has two fixing portions 600. The two fixing portions 600 can also be locked onto a certain surface. Similar to the first locking portions 500, the two fixing portions 600 are designed to match the junction box so that they can be locked onto the junction box easily. Also noteworthy is that the number of the fixing portion 600 is not intended to limit the disclosure. A tilt angle θ is formed between the fixing surface 590 and the base 100". In this embodiment, the tilt angle θ is 15 degrees. Thereby, when the adjustment base 501 is fixed to a high and vertical wall via the two fixing portions 600, the camera 200" is facing downward at the tilt angle θ, which enables the camera 200" to record video at a more appropriate angle.

In this embodiment, the fixing surface 590 has an opening 610 for passing through a cable. A part opposite to the fixing surface 590 in the adjustment base 501 is recessed inward and therefore forms a recess 570. That is, the part of the adjustment base 501 is opposite to the fixing surface 590 and is recessed inward and forms a recess 570. At least one stick 700 for wire-arrangement is disposed on the recess 570. Hence, a user may, for example, wind the cable around the at least one stick 700 to keep the cable neat. In other embodiments, the number of the stick 700 may be one or more than one.

In the video surveillance component and the video surveillance assembly, the base and the case of the camera both have a fastening element, so that the camera can slide relative to the base and make the two fastening elements be fastened with each other or be separated from each other. Thereby, the processes of the assembly and disassembly of the camera of the video surveillance component or of the video surveillance assembly are improved.

Moreover, since there is no fastening relationship between the camera outlet and the cable, the assemblers can put the camera on the base or detach the camera from the base without hindrance during the assembly of the base and the camera.

Furthermore, the camera has the two hanging members. The two hanging members each has a hanging hole portion for screwing, so that the camera can be hung on the wall without the base. Therefore, the number of assembly methods has been increased.

Additionally, the assemblers can utilize the locking member to screw up the hanging hole portion of the hanging member and the locking hole of the back plate, so as to lock the camera to the back plate. Thereby, this can prevent the camera from falling off the base, and even can prevent the camera from being stolen.

Multiple video surveillance components can even be combined via the base to expand the field of view.

Furthermore, in the embodiment that the fastening tab protrudes from the support stand, when removing the camera connected to the base, the fastening tab is maintained to be fastened with the connector of the camera to ensure the quality of the electrical connection between them.

Moreover the support stand disposes the release hole so that the fastening tab can be pushed by the external release member or the release button installed on the support stand. Thereby, the connecting member of the camera and the connector of the cable can be separated from each other.

Additionally, the adjustment base according to still another embodiment has a first fixing surface and a second fixing surface, and a tilt angle is formed between the first fixing surface and the second fixing surface. Thereby, when the adjustment base is fixed to a high and vertical wall, the camera is facing downward at the tilt angle and this enables the camera to record video at a more appropriate angle.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video surveillance component comprising:
   a base; and
   a camera comprising:
   a case detachably assembled to the base; and
   a camera lens module installed on the case;
   wherein the base comprises a support stand and a back plate, the back plate is erected on the support stand, the back plate has at least one first fastening element, the case has a bottom surface and an installation surface connected to each other, the case comprises at least one second fastening element, the second fastening element is located on the installation surface, and the first fastening element and the second fastening element are fastened with each other, so as to make the installation surface lean against the back plate, and make the bottom surface lean against the support stand; and
   wherein the first fastening element comprises a support block and a fastening block connected to each other, the second fastening element comprises a release hole and a fastening hole connected to each other, the case is configured for sliding relative to the base and therefore has a release position and a fastening position, when the case is at the release position, the support block is at the release hole, and when the case slides from the release position to the fastening position, the support block is at the fastening hole, and the fastening block is fastened with the side edge of the fastening hole.

2. The video surveillance component according to claim 1, wherein the camera further comprises an socket, the socket is installed on the case and is located at the bottom surface, the support stand has a support surface and a through hole, the through hole penetrates the support surface of the support stand, the through hole is configured for accommodating a cable, a part of the cable protrudes from the support surface, so as to make the cable be electronically connected to the socket, wherein there is no fastening connection between the socket and the cable.

3. The video surveillance component according to claim 1, wherein the case has a top surface, the top surface and the bottom surface are connected to the opposite sides of the installation surface, the video surveillance component further has two hanging members, the two hanging members are pivotally disposed on the case respectively, the two hanging members are located on the installation surface, and are near the top surface and the bottom surface respectively, each of the hanging members is configured for pivoting relative to the case and therefore has a using position and a storage position, each of the hanging members has a hanging hole portion, when the case and the base are separated from each other and when the two hanging members are at the using position, one of the two hanging hole portions protrudes from the top surface while the other of the two hanging hole portions protrudes from the bottom surface, when the two hanging members are at the storage position, the two hanging hole portions are attached to the installation surface.

4. The video surveillance component according to claim 1, wherein the camera comprises a connecting member configured for being plugged by a cable, the cable comprises a connector, the connector comprises a main body and a fastening tab, one end of the fastening tab is connected to the main body, the connecting member comprises a fastening portion, the connector is connected to the connecting member in a detachable manner, and the fastening portion is configured for fastening with the fastening tab.

5. The video surveillance component according to claim 4, wherein the base has an external surface, a through slot and a release hole, the release hole penetrates from the surface of the through slot to the external surface of the base, the through slot is configured for being disposed by the connector, so as to make the fastening tab face the release hole, and to make the release hole expose a part of the fastening tab.

6. The video surveillance component according to claim 5, further comprising a release member, wherein the release member is movably disposed on the release hole and therefore has a fastening position and a release position, when the release member is at the fastening position, the release member pushes the fastening tab so that the fastening tab moves away from the release hole, and when the release member is at the release position, the release member is detached from the fastening tab, so as to make the fastening tab close to the release hole.

7. The video surveillance component according to claim 5, further comprising a locking member, the locking member has an annular flange, the locking member is located inside the through slot and is disposed on the support stand in a detachable manner, the annular flange of the locking member pushes the bottom edge of the connector, so as to make a part of the connector is fixed to a place between the support plate and the annular flange.

8. The video surveillance component according to claim 1, wherein the base has at least one first locking portion, the at least one first locking portion is located on one side, away from the camera, of the base.

9. The video surveillance component according to claim 8, further comprising an adjustment base, wherein the adjustment base has a fixing surface and at least one second locking portion opposite to the fixing surface, the first locking portion of the base is locked into the second locking portion, and the base is attached to the adjustment base, wherein a tilt angle is formed between the fixing surface and the base.

10. The video surveillance component according to claim 9, wherein the fixing surface has an opening for passing through a cable.

11. The video surveillance component according to claim 10, wherein a part opposite to the fixing surface in the adjustment base is recessed inward and therefore forms a recess, at least one stick for wire-arrangement is disposed on the recess.

12. A video surveillance component comprising:
a base; and
a camera comprising:
a case detachably assembled to the base; and
a camera lens module installed on the case;
wherein the base comprises a support stand and a back plate, the back plate is erected on the support stand, the back plate has at least one first fastening element, the case has a bottom surface and an installation surface connected to each other, the case comprises at least one second fastening element, the second fastening element is located on the installation surface, and the first fastening element and the second fastening element are fastened with each other, so as to make the installation surface lean against the back plate, and make the bottom surface lean against the support stand; and
wherein the camera further comprises an socket, the socket is installed on the case and is located at the bottom surface, the support stand has a support surface and a through hole, the through hole penetrates the support surface of the support stand, the through hole is configured for accommodating a cable, a part of the cable protrudes from the support surface, so as to make the cable be electronically connected to the socket, wherein there is no fastening connection between the socket and the cable.

13. The video surveillance component according to claim 12, wherein the support stand further comprises a sliding groove, the sliding groove communicates the through hole, the base further comprises a fastening member, the fastening member is assembled to the sliding groove in a slidable way, the fastening member is configured for sliding relative to the sliding groove and therefore has a fixed position and an exit position, when the fastening member is at the fixed position, a part of the fastening member is inside the through hole, so as to fix the relative position of the cable and the support stand, and when the fastening member is at the exit position, the fastening member leaves the through hole, so as to make the cable be configured for exiting the through hole.

14. The video surveillance component according to claim 12, wherein the support stand comprises a wire-arrangement recess, the wire-arrangement recess communicates the through hole, the wire-arrangement recess has at least one opening, and the wire-arrangement recess is configured for accommodating the cable.

15. The video surveillance component according to claim 12, wherein the case has a top surface, the top surface and the bottom surface are connected to the opposite sides of the installation surface, the video surveillance component further has two hanging members, the two hanging members are pivotally disposed on the case respectively, the two hanging members are located on the installation surface, and are near the top surface and the bottom surface respectively, each of the hanging members is configured for pivoting relative to the case and therefore has a using position and a storage position, each of the hanging members has a hanging hole portion, when the case and the base are separated from each other and when the two hanging members are at the using position, one of the two hanging hole portions protrudes from the top surface while the other of the two hanging hole portions protrudes from the bottom surface, when the two hanging members are at the storage position, the two hanging hole portions are attached to the installation surface.

16. The video surveillance component according to claim 12, wherein the camera comprises a connecting member configured for being plugged by a cable, the cable comprises a connector, the connector comprises a main body and a fastening tab, one end of the fastening tab is connected to the main body, the connecting member comprises a fastening portion, the connector is connected to the connecting member in a detachable manner, and the fastening portion is configured for fastening with the fastening tab.

17. The video surveillance component according to claim 16, wherein the base has an external surface, a through slot and a release hole, the release hole penetrates from the surface of the through slot to the external surface of the base, the through slot is configured for being disposed by the connector, so as to make the fastening tab face the release hole, and to make the release hole expose a part of the fastening tab.

18. The video surveillance component according to claim 12, wherein the base has at least one first locking portion, the at least one first locking portion is located on one side, away from the camera, of the base.

19. A video surveillance component comprising:
a base; and
a camera comprising:
a case detachably assembled to the base; and
a camera lens module installed on the case;
wherein the base comprises a support stand and a back plate, the back plate is erected on the support stand, the back plate has at least one first fastening element, the case has a bottom surface and an installation surface connected to each other, the case comprises at least one second fastening element, the second fastening element is located on the installation surface, and the first fastening element and the second fastening element are fastened with each other, so as to make the installation surface lean against the back plate, and make the bottom surface lean against the support stand; and
wherein the case has a top surface, the top surface and the bottom surface are connected to the opposite sides of the installation surface, the video surveillance component further has two hanging members, the two hanging members are pivotally disposed on the case respectively, the two hanging members are located on the installation surface, and are near the top surface and the bottom surface respectively, each of the hanging members is configured for pivoting relative to the case and therefore has a using position and a storage position, each of the hanging members has a hanging hole portion, when the case and the base are separated from each other and when the two hanging members are at the using position, one of the two hanging hole portions protrudes from the top surface while the other of the two hanging hole portions protrudes from the bottom surface, when the two hanging members are at the storage position, the two hanging hole portions are attached to the installation surface.

20. The video surveillance component according to claim 19, wherein the back plate has a locking hole, when the hanging member near the top surface is at the using position, the locking hole aims at the hanging hole portion, so as to make a locking member penetrate the locking hole to make the case be fixed to the back plate.

21. The video surveillance component according to claim 19, wherein the camera comprises a connecting member configured for being plugged by a cable, the cable comprises a connector, the connector comprises a main body and a fastening tab, one end of the fastening tab is connected to the main body, the connecting member comprises a fastening portion, the connector is connected to the connecting member in a detachable manner, and the fastening portion is configured for fastening with the fastening tab.

22. The video surveillance component according to claim 21, wherein the base has an external surface, a through slot and a release hole, the release hole penetrates from the surface of the through slot to the external surface of the base, the through slot is configured for being disposed by the connector, so as to make the fastening tab face the release hole, and to make the release hole expose a part of the fastening tab.

23. The video surveillance component according to claim 19, wherein the base has at least one first locking portion, the at least one first locking portion is located on one side, away from the camera, of the base.

24. A video surveillance component comprising:
a base; and
a camera comprising:
a case detachably assembled to the base; and
a camera lens module installed on the case;
wherein the camera comprises a connecting member configured for being plugged by a cable, the cable comprises a connector, the connector comprises a main body and a fastening tab, one end of the fastening tab is connected to the main body, the connecting member comprises a fastening portion, the connector is connected to the connecting member in a detachable manner, and the fastening portion is configured for fastening with the fastening tab; and
wherein the base has an external surface, a through slot and a release hole, the release hole penetrates from the surface of the through slot to the external surface of the base, the through slot is configured for being disposed by the connector, so as to make the fastening tab face the release hole, and to make the release hole expose a part of the fastening tab.

25. The video surveillance component according to claim 24, wherein the base comprises a support stand and a back plate, the back plate is erected on the support stand, the back plate has at least one first fastening element, the case has a bottom surface and an installation surface connected to each other, the case comprises at least one second fastening element, the second fastening element is located on the installation surface, and the first fastening element and the second fastening element are fastened with each other, so as to make the installation surface lean against the back plate, and make the bottom surface lean against the support stand.

26. The video surveillance component according to claim 25, wherein the first fastening element comprises a support block and a fastening block connected to each other, the second fastening element comprises a release hole and a fastening hole connected to each other, the case is configured for sliding relative to the base and therefore has a release position and a fastening position, when the case is at the release position, the support block is at the release hole, and when the case slides from the release position to the fastening position, the support block is at the fastening hole, and the fastening block is fastened with the side edge of the fastening hole.

27. The video surveillance component according to claim 25, wherein the camera further comprises an socket, the socket is installed on the case and is located at the bottom surface, the support stand has a support surface and a through hole, the through hole penetrates the support surface of the support stand, the through hole is configured for accommodating a cable, a part of the cable protrudes from the support surface, so as to make the cable be electronically connected to the socket, wherein there is no fastening connection between the socket and the cable.

28. The video surveillance component according to claim 25, wherein the case has a top surface, the top surface and the bottom surface are connected to the opposite sides of the installation surface, the video surveillance component further has two hanging members, the two hanging members are pivotally disposed on the case respectively, the two hanging members are located on the installation surface, and are near the top surface and the bottom surface respectively, each of the hanging members is configured for pivoting relative to the case and therefore has a using position and a storage position, each of the hanging members has a hanging hole portion, when the case and the base are separated from each other and when the two hanging members are at the using position, one of the two hanging hole portions protrudes from the top surface while the other of the two hanging hole portions protrudes from the bottom surface, when the two hanging members are at the storage position, the two hanging hole portions are attached to the installation surface.

29. The video surveillance component according to claim 24, further comprising a release member, wherein the release member is movably disposed on the release hole and therefore has a fastening position and a release position, when the release member is at the fastening position, the release member pushes the fastening tab so that the fastening tab moves away from the release hole, and when the release member is at the release position, the release member is detached from the fastening tab, so as to make the fastening tab close to the release hole.

30. The video surveillance component according to claim 24, wherein the base comprises a support stand and a back plate, the support stand has a support plate and a lateral plate connected to the support plate, the back plate is erected on the support plate, the through slot and the release hole are located on the support stand, the through slot penetrates the support plate, and the release hole penetrates the lateral plate.

31. The video surveillance component according to claim 30, wherein the support plate has a first end surface and a second end surface which form the through slot, the first end surface is closer to the release hole than the second end surface, the connector has a contact surface, the fastening tab faces the first end surface while the contact surface faces the second end surface, the maximum distance between the fastening tab and the contact surface is less than the distance between the first end surface and the second end surface.

32. The video surveillance component according to claim 30, further comprising a locking member, the locking member has an annular flange, the locking member is located inside the through slot and is disposed on the support stand in a detachable manner, the annular flange of the locking member pushes the bottom edge of the connector, so as to make a part of the connector is fixed to a place between the support plate and the annular flange.

33. The video surveillance component according to claim 30, wherein the support stand comprises a wire-arrangement recess, the wire-arrangement recess communicates the through hole, the wire-arrangement recess has at least one opening, and the wire-arrangement recess is configured for accommodating the cable.

34. The video surveillance component according to claim 30, wherein the back plate has at least one first fastening element, the case has a bottom surface and an installation surface connected to each other, the case comprises at least one second fastening element, the second fastening element is located on the installation surface, and the first fastening element and the second fastening element are fastened with each other, so as to make the installation surface lean against the back plate, and make the bottom surface lean against the support stand.

35. The video surveillance component according to claim 24, wherein the base has at least one first locking portion, the at least one first locking portion is located on one side, away from the camera, of the base.

* * * * *